(12) United States Patent
Shah et al.

(10) Patent No.: US 10,565,038 B1
(45) Date of Patent: Feb. 18, 2020

(54) METHOD AND APPARATUS FOR GRAPH-BASED COMPUTING

(71) Applicant: Massachusetts Institute of Technology, Cambridge, MA (US)

(72) Inventors: Devavrat D. Shah, Waban, MA (US); Vinayak Ramesh, Cambridge, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 0 days.

(21) Appl. No.: 16/201,492

(22) Filed: Nov. 27, 2018

(51) Int. Cl.
*G06F 3/00* (2006.01)
*G06F 9/54* (2006.01)
*G06F 16/901* (2019.01)

(52) U.S. Cl.
CPC .......... *G06F 9/546* (2013.01); *G06F 16/9024* (2019.01)

(58) Field of Classification Search
CPC ..................................................... G06F 9/546
USPC ....................................................... 719/310
See application file for complete search history.

(56) References Cited

U.S. PATENT DOCUMENTS 6,732,147 B1 * 5/2004 Holt .................... H04L 12/1813
  709/204
2011/0276962 A1 * 11/2011 Chambers ............. G06F 9/3885
  718/1

OTHER PUBLICATIONS

Steven Bird, Annotation Tools Based on the Annotation Graph API, (Year: 2001).*
Konstantin Andreev, Harald Racke, Balanced Graph Partitioning, In Proceedings of the Sixteenth Annual ACM Symposium on Parallelism in Algorithms and Architectures (New York, NY, USA, 2004), SPAA '04, ACM, pp. 120-124, (6 pages).
Mohsen Bayati, Devavrat Shah, Mayank Sharma, Max-product for maximum weight matching: convergence, correctness and LP duality, IEEE Transactions on Information Theory 54, 3 (2008), 1241-1251, (10 pages).
Reza Bosagh Zadeh, Xiangrui Meng, Alexander Ulanov, Burak Yavuz, Li Pu, Shivaram Venkataraman, Evan Sparks, Aaron Staple, Matei Zaharia, Matrix Computations and Optimization in Apache Spark, In Proceedings of the 22Nd ACM SIGKDD International Conference on Knowledge Discovery and Data Mining (New York, NY, USA, 2016), KDD '16, ACM, pp. 31-38, (8 pages).
Jeffrey Dean and Sanjay Ghemawat, MapReduce: Simplified Data Processing on Large Clusters, Commun. ACM 51, 1 (Jan. 2008), 107-113 (7 pages).
G. David Forney, Jr. Fellow, IEEE, Codes on Graphs: Normal Realizations, IEEE Transactions on Information Theory 47, 2 (2001), 520-548, (29 pages).

(Continued)

*Primary Examiner* — Lechi Truong
(74) *Attorney, Agent, or Firm* — Daly, Crowley, Mofford & Durkee, LLP

(57) ABSTRACT

A method is disclosed including: receiving a graph-based program that identifies a bipartite graph and one or more update function sets, the bipartite graph including a plurality of graph nodes and a plurality of edges, such that each graph node corresponds to one of the update function sets; associating each of a plurality of computing units with a different respective one of the graph nodes; instantiating, by a Publisher Subscriber platform, a plurality of channels, the plurality of channels defining a topology that matches a topology of the bipartite graph; and executing the graph-based program based on the plurality of channels to produce a result.

18 Claims, 19 Drawing Sheets

(56) References Cited

OTHER PUBLICATIONS

David Gamarnik, Tomasz Nowicki, Grzegorz Swirszcz, Maximum Weight Independence Sets and Matching in Sparse Random Graphs. Exact Results Using the Local Weak Convergence Method, Random Structures and Algorithms 28, 1 (2006), 76-106 (31 pages).

David Gamarnik, Deverat Shah, Yehua Wei, Belief Propagation for Min-cost Network Flow: Operations Research 60, 2 (2012), 410-428, (35 pages).

Jay Kreps, Neha Narkhede, Jun Roa, Kafka: a Distributed Messaging System for Log Processing, Copyright 2011, ACM 978-1-4503-0652, Jun. 12, 2011, (7 pages).

Cornelius Lanczos, An Iteration Method for the Solution of the Eigenvalue Problem of Linear Differential and Integral Operators[1], Journal of Research of the National Bureau of Standards, vol. 45, No. 4, Oct. 1950, Research Paper 2133, pp. 255-282 (28 pages).

Sujay Sanghavi,Member, IEEE, Devavrat Shah, Alan S. Willsky, Fellow, IEEE, Message Passing for Maximum Weight Independent Set, IEEE Transaction on Information Theory, vol. 55, No. 11, Nov. 2009, pp. 4822-4834 (13 pages).

Services, A. W. What is pub/sub messaging? https://aws.amazon.com/pub-sub-messaging/. downloaded May 14, 2019, pp. 1-6 (6 pages). no date lc.

Julian Shun, Guy E. Blelloch, Ligra: A Lightweight Graph Processing Framework for Shared Memory, SIGPLAN Not. 48, 8 (Feb. 2013), 135-146, (12 pages).

Julian Shun, Laxman Dhulipala, Guy E. Blelloch, Smaller and Faster: Parallel Processing of Compressed Graphs with Ligra+ in Data Compression Conference (DCC), 2015 (2015), IEEE, pp. 403-412, (10 pages).

Julian Shun, Farbod Roosta-Khorasani 1[T], Michael W. Mahoney 1[T],, Parallel Local Graph Clustering, Proceedings of the VLDB Endowment 9, 12 (2016), pp. 1041-1052, (12 pages).

Hava Siegelmann, Eduardo D. Sontag, On The Computational Power of Neural Nets, Journal of computer and system sciences 50, 1 (1995), pp. 132-150, (10 pages).

Daniel A. Spielman, Shang-Hua Teng, Nearly-Linear Time Algorithms for Graph Partitioning, Graph Sparsification, and Solving Linear Systems, In Proceedings of the Thirty-sixth Annual ACM Symposium on Theory of Computing (New York, NY, USA, 2004), STOC '04, ACM, pp. 81-90, (10 pages).

R. Michael Tanner, A Recursive Approach to Low Complexity Codes, IEEE, Transactions on Information Theory vol. IT-27, No. 5, Sep. 1981 pp. 533-547 (15 pages).

Jonathan S. Yedidia, William T. Freeman, Yair Weiss, Generalized Belief Propagation, In Advances in neural information processing systems (2001), pp. 689-695 (7 pages).

Jonathan S. Yedidia, William T. Freeman, Yair Weiss, Understanding Belief Propagation and its Generalizations. Exploring artificial intelligence in the new millennium 8 (2003), (33 pages).

Matei Zaharia, Mosharaf Chowdhury, Michael J. Franklin, Scott Shenker, Ion Stoica, Spark: Cluster Computing with Working Sets, In Proceedings of the $2^{Nd}$ USENIX Conference on Hot Topic in Cloud Computing (Berkley, CA, USA, 2010), Hot-Cloud '10, Unsenix Association, pp. 1-7 (7 pages).

Akka concurrency framework. https://akka.io/. 3 pages downloaded May 23, 2019.

Cilkplus. https://www.cilkplus.org/. 3 pages downloaded May 23, 2019.

Zero mq. http://zeromq.org/. 1 page downloaded May 23, 2019.

Apache. Active mq. http://activemq.apache.org/. 2 pages downloaded May 23, 2019.

Appache Software Foundation. Hadoop. https://hadoop.apache.org 3 pages downloaded May 23, 2019.

Contributors, W. Publish ĂSubscribe pattern—Wikipedia, the free encyclopedia. https://en.wikipedia.org/. 4 pages downloaded May 23, 2019.

Frey, B.J., Kschischang F.R., Loeliger H.A., and Wiberg N. Factor graphs and algorithms. *In Proceedings of the Annual Allerton Conference on Communication and Control Computing* (1997) vol. 35, University of Illinois, pp. 666-680, (15 pages).

Gurobi Optimization I. Gurobi optimizer reference manual gurobi.com 2016 pp. 752-777, (26 pages) downloaded May 23, 2019.

Koch, T., Achterberg, T., Andersen E., Bastert, O., Berthold , T., Bixby, R.E., Danna, E., Gamrath, G., Gleixner, A.M., Heinz, S., Lodi, A., Mittleman, H., Ralphs, T., Salvagnin, D., Steffy, D.E., and Wolter, K., MIPLIB 2010, Mathematical Programming Computation 3,2 (2011), pp. 103-163 (46 pages).

Platform G.C. Cloud pub/sub.https://cloud.google.com/pubsub/.pp. 1-10 (10 pages) downloaded May 23, 2019.

Redis Labs. Redis. https://redis.io 2 pages downloaded May 23, 2019.

Services A.W. Amazon simple notification service (sns) https://aws.amazon.com/sns/ 13 pages downloaded May 23, 2019.

Lesovec, J. and Krevl, A., SNAP Datasets: Stanford large network dataset collection. http://snap.stanford.edu/data, Jun. 2014, 112 pages downloaded May 23, 2019.

* cited by examiner

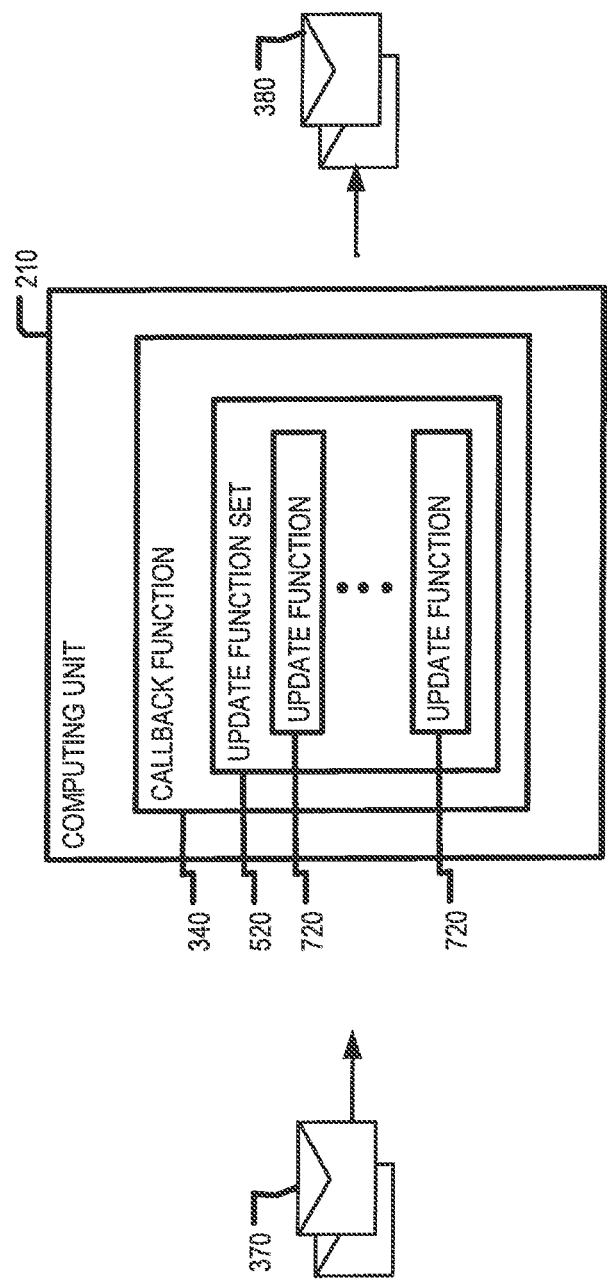

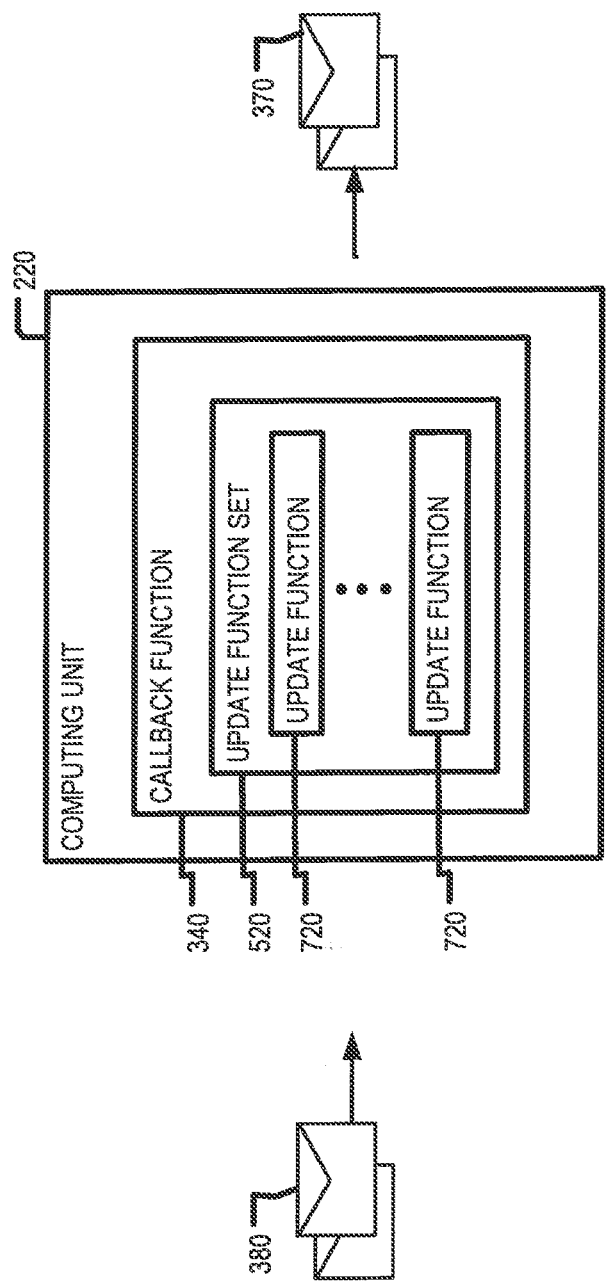

METHOD AND APPARATUS FOR GRAPH-BASED COMPUTING

STATEMENT REGARDING FEDERALLY SPONSORED RESEARCH

This invention was made with Government support under Grant No. CMMI1462158 awarded by the National Science Foundation (NSF), and Grant No. W911NF-16-1-0551 awarded by the U.S. Army Research Office. The Government has certain rights in the invention.

SUMMARY

Over the past few decades, various data storage and computation infrastructures have emerged to cope with scale of data processing systems. The intellectual development of such infrastructures was entirely driven by optimizing use of "memory" or equivalently alleviating the "Input-Output/IO" bottleneck. However, such infrastructures have frequently failed to optimize use of network resources or equivalently alleviate various types of communication bottlenecks that are present in them. Accordingly, the need exists for new data storage and computation infrastructure designs that feature a reduced amount of communication bottlenecks, and utilize their available computation resources to the fullest extent.

The present disclosure addresses this need. According to one aspect of the disclosure, a method for use in a system comprising a messaging platform and a plurality of computing units, the method comprising: receiving a graph-based program that identifies a bipartite graph and one or more update function sets, the bipartite graph including a plurality of graph nodes and a plurality of edges, such that each graph node corresponds to one of the update function sets; associating each of the computing units with a different respective one of the graph nodes, the associating including providing the computing unit with the respective graph node's corresponding update function set; instantiating, by the Messaging platform, a plurality of channels, the plurality of channels defining a topology that matches a topology of the bipartite graph, each of the plurality of channels being associated with at least a pair of the computing units, the computing units in the pair being associated with respective graph nodes in the bipartite graph that are connected by one of the plurality of edges, such that one of the computing units in the pair is registered on the channel as a publisher, and the other one of the computing units in the pair is registered on the channel as a subscriber; and executing the graph-based program to produce a result.

According to another aspect of the disclosure, a system is disclosed comprising: a memory; and a processing circuitry operatively coupled to the memory, the processing circuitry being configured to: receive a graph-based program that identifies a bipartite graph and one or more update function sets, the bipartite graph including a plurality of graph nodes and a plurality of edges, such that each graph node corresponds to one of the update function sets; associate each of a plurality of computing units with a different respective one of the graph nodes, the associating including providing the computing unit with the respective graph node's corresponding update function set; instantiate a plurality of channels, the plurality of channels defining a topology that matches a topology of the bipartite graph, each of the plurality of channels being associated with at least a pair of the computing units, the computing units in the pair being associated with respective graph nodes in the bipartite graph that are connected by one of the plurality of edges, such that one of the computing units in the pair is registered on the channel as a publisher, and the other one of the computing units in the pair is registered on the channel as a subscriber; and execute the graph-based program to produce a result.

receiving a graph-based program that identifies a bipartite graph and one or more update function sets, the bipartite graph including a plurality of graph nodes and a plurality of edges, such that each graph node corresponds to one of the update function sets; associating each of the computing units with a different respective one of the graph nodes, the associating including providing the computing unit with the respective graph node's corresponding update function set; instantiating a plurality of channels, the plurality of channels defining a topology that matches a topology of the bipartite graph, each of the plurality of channels being associated with at least a pair of the computing units, the computing units in the pair being associated with respective graph nodes in the bipartite graph that are connected by one of the plurality of edges, such that one of the computing units in the pair is registered on the channel as a publisher, and the other one of the computing units in the pair is registered on the channel as a subscriber; and executing the graph-based program to produce a result.

It will be understood that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 3B is a diagram of an example of a computing unit from the computing system of FIG. 1, according to aspects of the disclosure;

FIG. 3C is a diagram of an example of a computing unit from the computing system of FIG. 1, according to aspects of the disclosure;

DETAILED DESCRIPTION

Figure 1:
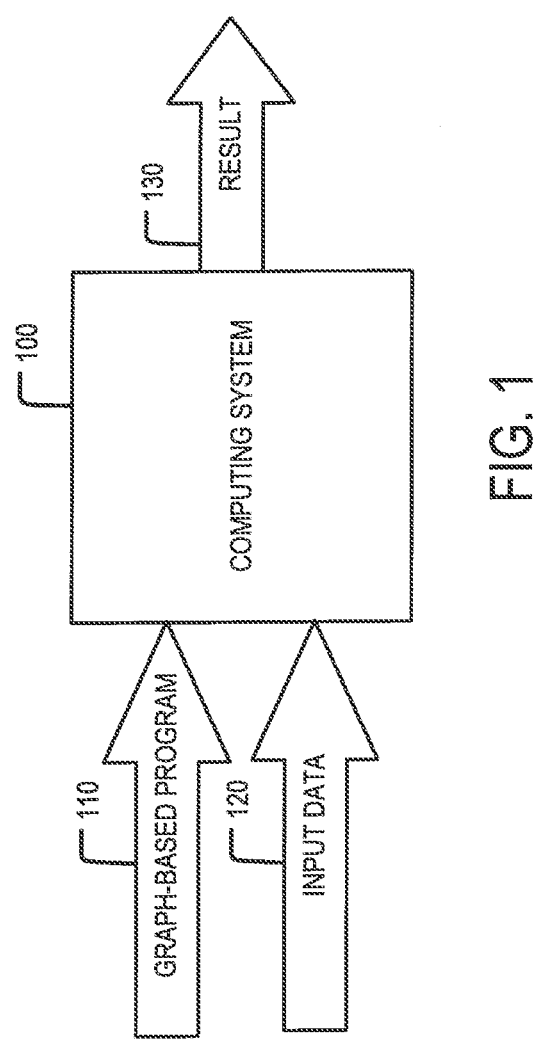
FIG. 1 is a diagram of an example of a computing system, according to aspects of the disclosure.

According to aspects of the disclosure, a graph-based programming language is disclosed that can be used to improve the efficiency with which computing systems utilize their available communications infrastructure(s) (e.g., communications networks, inter-process communication infrastructure, communication bus infrastructure, etc.). Programs written in this language identify a bipartite graph and at least one of set of update functions. The bipartite graph may include a plurality of nodes and a plurality of edges. The nodes in the graph may be associated with different update functions and/or update function sets. The edges of the graph may define data flow path(s) along which data generated by the update function set(s) will travel between the nodes in the graph (and/or computing units that are assigned to the nodes). According to this arrangement, in any graph-based program that is written in the graph-based language, the update function set(s) define data processing operations, and the bipartite graph defines an order in which the operations are to be performed.

A graph-based program written in the language can be executed by a computing system comprising a messaging platform and a plurality of computing units that are communicatively coupled to one another via the messaging platform. Executing the graph-based program may include assigning each of the computing units to a different node of the program's graph and causing each of the computing units to execute one or more respective update functions that are: (i) identified by the graph-based program, and (ii) associated with the node that is assigned to the computing unit. When the graph-based program is executed, each of the computing units may execute its respective update function(s) to generate messages, which are subsequently delivered to other computing units via channels provided by the messaging platform in accordance with the topology of the graph. The other computing units may execute their respective update functions using the received messages as input to generate new messages, and the new messages may again be transmitted to other computing units in the computing system. This cycle of message generation based on received messages and subsequent transmission of the generated messages for them to be used by other computing units to generate new messages may be repeated until the distributed computing system has reached a desired state.

A desired state of the computing system may be one in which one or more messages that are generated by any of the computing units in the system represents a result—i.e., the final product of a computation which the graph-based program is designed to perform. In some implementations, a message or set of messages may represent a result when the contents of the message or set of messages is itself the result or when the message or set of messages can be used to generate the result by performing additional processing of the message(s). As is further discussed below, some implementations of the graph-based language are Turing-complete, and as such, they are not limited with respect to the types of algorithms they can implement and/or the types of computations which they can perform.

FIG. 1 is a diagram illustrating the operation of a computing system 100, according to aspects of the disclosure. As illustrated, in operation, the computing system 100 may receive a graph-based program 110 and an input data set 120 as inputs and generate a result 130 as its output. The graph-based program 110, according to the present disclosure, is implemented using a graph-based programming language. The graph-based program 110 and the graph-based programming language are discussed in greater detail further below. The input data set 120 may include any suitable type of data. In some implementations, the input data set 120 may include a number, a string, an alphanumerical string, and/or any other suitable type of data item. Additionally or alternatively, in some implementations, the input data set 120 may include a plurality of data items. The result 130 may also include any suitable type of data that is generated by the graph-based program 110 when the graph-based program 110 is executed, by the computing system 100, with the input data set 120 being used as input to the graph-based program 110. In some implementations, the result 130 may include a number, a string, an alphanumerical string, and/or any other suitable type of data item. Additionally or alternatively, in some implementations, the result 130 may include a plurality of data items. As used throughout the disclosure, the phrase "a set of data items" may refer to one or more data items. For example, a set of data items may include only one data item (e.g., the number '1') or a plurality of data items (e.g., the numbers '1', '3', '5', '19', and '53').

Figure 2:
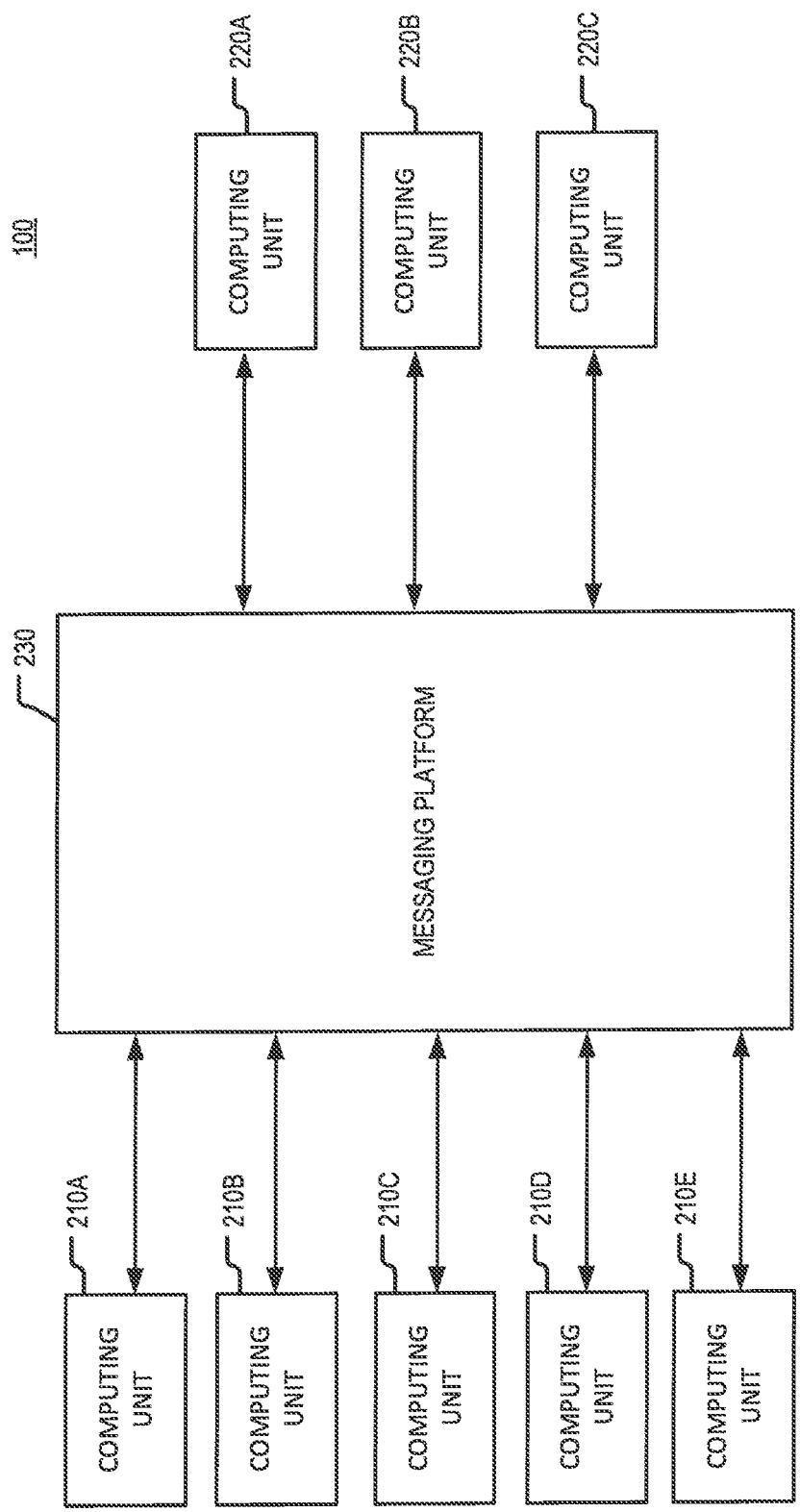
FIG. 2 is a diagram showing the computing system of FIG. 1 in further detail, according to aspects of the disclosure.

FIG. 2 shows the computing system 100 in further detail, according to aspects of the disclosure. As illustrated, the computing system 100 may include a plurality of computing units 210 and 220, and a messaging platform 230. In some implementations, at least some of the computing units 210 and 220 may be implemented as separate physical devices (e.g., separate servers). Additionally or alternatively, in some implementations, at least some of the computing units 210 may be implemented as different processes or threads that are executed on the same physical device. Additionally or alternatively, in some implementations, at least some of the computing units 210 may be implemented as different virtual machines that are executed on the same physical device. Similarly, in some implementations, the messaging platform 230 may be implemented on a separate physical device. Additionally or alternatively, in some implementations, at least some of the computing units may be implemented as different cores on a general-purpose processor. Additionally or alternatively, in some implementations, at least some of the computing units may be implemented as different cores on a graphical processing unit (GPU) and/or another type of special-purpose processor. Additionally or alternatively, in some implementations, the messaging platform 230 may be implemented as a process, thread, and/or virtual machine that is executed on the same physical device as one or more of the computing units 210 and 220. Additionally or alternatively, in some implementations, the messaging platform 230 may be implemented as a separate core in a processor (e.g., a general purpose processor or special purpose processor) that is also used to implement one or more of the computing units 210 and 220. Stated succinctly, the present disclosure is not limited to any specific implementation of the computing system 100. Although not shown, the computing units 210 and 220 may be connected to the messaging platform 230 via a communications network. The communications network may include an InfiniBand (IB) network, a TCP/IP network, a local area network (LAN), a wide area network (WAN), the Internet and/or any other suitable type of network. Additionally or alternatively, in implementations where at least one of the computing units 210 and 220 is implemented on the physical device as the messaging platform, that computing unit may be connected to the messaging platform via a system bus, a shared memory, and/or another means for inter-process communication. Stated succinctly, the present disclosure is not limited to any specific type of communications infrastructure for connecting the computing units 210 and 220 and the messaging platform 230 to one another.

Figure 3A:
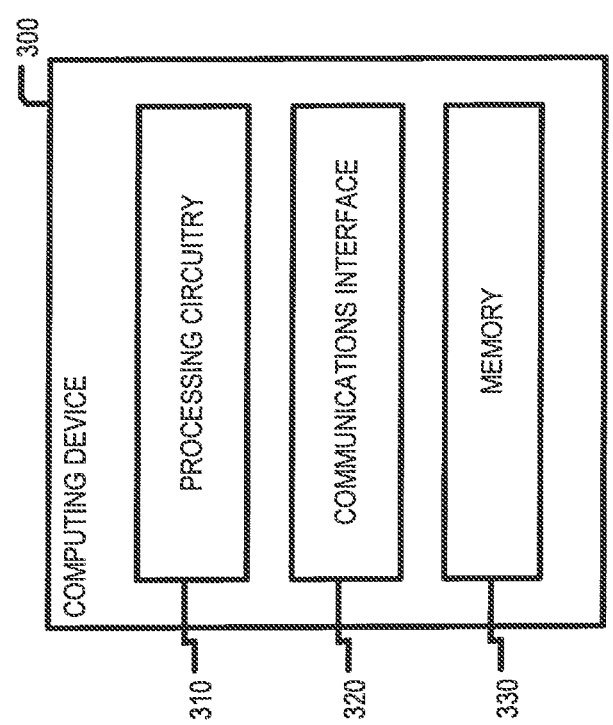
FIG. 3A is a diagram of a computing device that can be used to implement one or more computing nodes in the computing system of FIG. 1, according to aspects of the disclosure.

FIG. 3A is a diagram of an example of a physical computing device 300 that can be used to implement any of the computing units 210 and/or 220. As illustrated, the physical computing device 300 may include a processing circuitry 310 that is operatively coupled to a communications interface 320 and a memory 330. The processing circuitry 310 may include one or more of a general-purpose processor (e.g., MIPS processors, x86 processors, ARM-based processors, etc.), a Field-Programmable Gate Array, an application-specific integrated circuit (ASIC), a graphical processing unit (GPU), a central processing unit (CPU), and/or any other suitable type of processing circuitry. The communications interface 320 may include an Ethernet communications interface, an InfiniBand (IB) communications interface, an 802.11 communications interface and/or any other suitable type of communications interface. The memory 330 may include any suitable type of volatile and/or non-volatile memory, such as a random-access memory (RAM), a solid-state drive (SSD), a hard disk (HD), a flash memory, etc. In some implementations, the physical computing device 300 may be a blade server, a laptop, a desktop, and/or any other suitable type of device. Although FIG. 3 depicts the physical computing device as an integrated device, it will be understood that in some implementations, the physical computing device may be a distributed system including a plurality of physical computing devices that are connected to one another via a communications network. In such implementations, the physical computing device may include a server rack, a computer cluster, and/or any other suitable type of distributed computing system. Although not shown, in some implementations, the physical computing device 300 may include an input device (e.g., a keyboard, a mouse, a microphone, etc.) and/or an output device (e.g., a display, a speaker, a vibration generator, etc.).

FIG. 3B is a schematic diagram showing an example of the configuration of a computing unit 210, which as the numbering suggests, is representative of any of the computing units 210A-E, according to aspects of the disclosure.

As illustrated, the computing unit 210 may be configured to execute a callback function 340, and an update function set 520 including one or more update functions 720. The callback function 340 may include one or more machine-readable instructions, which when executed by a processing circuitry of the computing unit 210, cause the computing unit 210 to execute each (or at least one) of the update functions 720. Although in the present example, the callback function 340 is implemented in software, it will be understood that alternative implementations are possible in which the callback function 340 is implemented in hardware or as a combination of software and hardware.

In operation, the computing unit 210 may receive one or more input messages 370 and generate one or more output messages 380. Each of the messages 370 may be generated by any of the computing units 220. Each of the messages 370 may include a data set that is generated by a respective update function that is executed on the computing unit 220 that transmitted the message. Each of the messages 370 may be delivered over a channel (e.g., logical channel) that is provided by the messaging platform 230, which the computing unit 210 is registered as a subscriber on. Each of the messages 380 may be generated based on respective one or more of the messages 370. By way of example, in some implementations, each of the messages 380, may be generated based on only one of the messages 370. Each of the messages 380 may be generated by one of the update functions 720. More particularly, in some implementations, each of the messages 380 may be generated by one of the update functions 720 based on at least some of the data set that is part of a respective one of the messages 370. Each of the messages 380 may be transmitted to only one of the computing units 220 via a channel provided by the messaging platform 230, which the computing unit 210 is registered as a publisher on and on which the receiving computing unit 220 is registered as a subscriber.

In some implementations, for any given message 370 that is received by the computing unit 210, the computing unit 210 may generate a plurality of messages 380. Each message 380 in the plurality may be generated by a different one of the update functions 720 (which are stored in the memory space of the computing unit 210) and transmitted to a different one of the computing units 220 via a different channel that is provided by the messaging platform 230 on which the computing unit 210 is registered as a publisher and the receiving computing unit 220 is registered as a subscriber.

In some implementations, the update function set 520 may be part of the graph-based program 110, and it may be uploaded on (or stored in a memory space of) the computing unit 210A when the computing system 100 is configured to execute the graph-based program 110. Each of the update functions 720 in the update function set 520 may include one or more machine-readable instructions which when executed by a processing circuitry of the computing unit 210 cause the processing circuitry to generate a new message based on data contained in a message that is received at the computing unit 210. In some implementations, each of the update functions 720 may be associated with a different one of the computing units 220, such that messages generated by that update function 720 are transmitted only to that computing unit 220 via a channel provided by the messaging platform 230. Additionally or alternatively, in some implementations, the computing unit 210 may be registered as a publisher on one or more channels provided by the messaging platform 230. In such instances, a different update function 720 may be stored in a memory space of the computing unit 210 for each channel the computing unit 210 is registered as a publisher on, such that messages that are generated by that update function 720 are transmitted by the computing unit 210 over that function's respective channel only.

In some implementations, the computing unit 210 may be configured to receive/transmit the messages 370/380 over channels that are provided by the messaging platform 230. Those channels may connect the computing unit 210 to one or more of the computing units 220. In this regard, the messages 370 may include only messages that are generated by one or more computing units 220, and the messages 380 may be transmitted only to one or more of the computing units 220. In this regard, in some implementations, the computing unit 210 may be configured to exchange messages with the computing units 220, but not with other computing units 210. In some implementations, the callback function 340 may be invoked (e.g., called) remotely by the messaging platform 230, to trigger execution of each (or at least one) of the update functions 720. More specifically, to invoke the callback function 340, the messaging platform 230 may transmit an instruction to the computing unit 210.

Although in the present example the update functions 720 are depicted as separate executable routines, it will be understood that in some implementations the update functions 720 may be integrated into the same executable routine. In such instances, when the executable routine is executed with a parameter having a first value, a respective update function 720 that corresponds to the parameter value may be executed; when the executable routine is executed with the parameter having another value, another update function 720 that corresponds to the other value may be executed. Stated succinctly, the present disclosure is not limited to any specific implementation and/or representation of the update functions 720. Although in the present example, the update function set 520 is depicted as including multiple update functions 720, it will be understood that alternative implementations are possible in which the update function set 520 includes only one function 720. In this regard, the term "update function set" shall be interpreted as referring to a set of one or more functions.

FIG. 3C is a schematic diagram showing an example of the configuration of a computing unit 220, which as the numbering suggests, is representative of any of the computing units 220A-C, according to aspects of the disclosure.

As illustrated, the computing unit 220 may be configured to execute a callback function 340, and an update function set 520 including one or more update functions 720. The callback function 340 may include one or more machine-readable instructions, which when executed by a processing circuitry of the computing unit 220, cause the computing unit 220 to execute each (or at least one) of the update functions 720. Although in the present example, the callback function 340 is implemented in software, it will be understood that alternative implementations are possible in which the callback function 340 is implemented in hardware or as a combination of software and hardware.

In operation, the computing unit 220 may receive one or more input messages 380 and generate one or more output messages 370. Each of the messages 380 may be generated by any of the computing units 210. Each of the messages 380 may include a data set that is generated by a respective update function that is executed on the computing unit 210 that transmitted the message. Each of the messages 380 may be delivered over a channel (e.g., logical channel) that is provided by the messaging platform 230, which the computing unit 220 is registered as a subscriber on. Each of the messages 370 may be generated based on respective one or more of the messages 380. By way of example, in some implementations, each of the messages 370, may be generated based on only one of the messages 380. Each of the messages 370 may be generated by one of the update functions 720. More particularly, in some implementations, each of the messages 370 may be generated by one of the update functions 720 based on at least some of the data set that is part of a respective one of the messages 380. Each of the messages 370 may be transmitted to only one of the computing units 210 via a channel provided by the messaging platform 230, which the computing unit 220 is registered as a publisher on and on which the receiving computing unit 210 is registered as a subscriber.

In some implementations, for any given message 380 that is received by the computing unit 220, the computing unit 220 may generate a plurality of messages 370. Each message 370 in the plurality may be generated by a different one of the update functions 720 (which are stored in the memory space of the computing unit 220) and transmitted to a different one of the computing units 210 via a different channel that is provided by the messaging platform 230 on which the computing unit 220 is registered as a publisher and the receiving computing unit 210 is registered as a subscriber.

In some implementations, the update function set 520 may be part of the graph-based program 110, and it may be uploaded on (or stored in a memory space of) the computing unit 220A when the computing system 100 is configured to execute the graph-based program 110. Each of the update functions 720 in the update function set 520 may include one or more machine-readable instructions which when executed by a processing circuitry of the computing unit 220 cause the processing circuitry to generate a new message based on data contained in a message that is received at the computing unit 220. In some implementations, each of the update functions 720 may be associated with a different one of the computing units 210, such that messages generated by that update function 720 are transmitted only to that computing unit 210 via a channel provided by the messaging platform 230. Additionally or alternatively, in some implementations, the computing unit 220 may be registered as a publisher on one or more channels provided by the messaging platform 230. In such instances, a different update function 720 may be stored in a memory space of the computing unit 220 for each channel the computing unit 220 is registered as a publisher on, such that messages that are generated by that update function 720 are transmitted by the computing unit 220 over that function's respective channel only.

In some implementations, the computing unit 220 may be configured to receive/transmit the messages 380/370 over channels that are provided by the messaging platform 230. Those channels may connect the computing unit 220 to one or more of the computing units 210. In this regard, the messages 380 may include only messages that are generated by one or more computing units 210, and the messages 370 may be transmitted only to one or more of the computing units 220. In this regard, in some implementations, the computing unit 220 may be configured to exchange messages with the computing units 210, but not with other computing units 210. In some implementations, the callback function 340 may be invoked (e.g., called) remotely by the messaging platform 230, to trigger execution of each (or at least one) of the update functions 720. More specifically, to invoke the callback function 340, the messaging platform 230 may transmit an instruction to the computing unit 220.

Although in the present example the update functions 720 are depicted as separate executable routines, it will be understood that in some implementations the update functions 720 may be integrated into the same executable routine. In such instances, when the executable routine is executed with a parameter having a first value, a respective update function 720 that corresponds to the parameter value may be executed; when the executable routine is executed with the parameter having another value, another update function 720 that corresponds to the other value may be executed. Stated succinctly, the present disclosure is not limited to any specific implementation and/or representation of the update functions 720. Although in the present example, the update function set 520 is depicted as including multiple update functions 720, it will be understood that alternative implementations are possible in which the update function set 520 includes only one function 720. In this regard, the term "update function set" shall be interpreted as referring to a set of one or more functions.

Figure 4A:
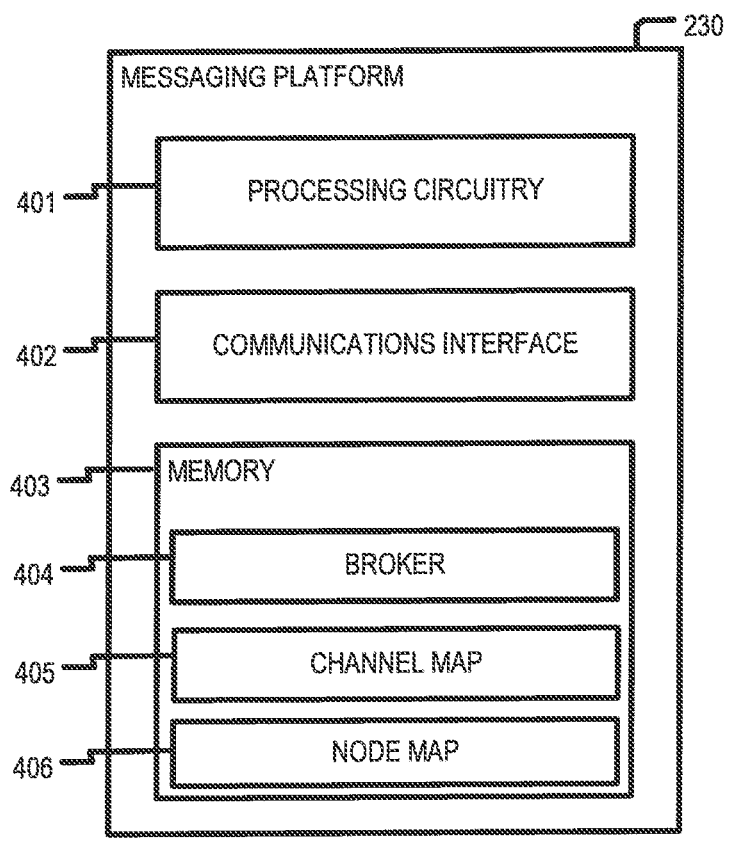
FIG. 4A is a diagram of a messaging platform that is part of the computing system of FIG. 1.

FIG. 4A is a diagram showing the messaging platform 230 in further detail, according to aspects of the disclosure. As illustrated, the messaging platform 230 may include a processing circuitry 401 that is operatively coupled to a communications interface 402 and a memory 403. The processing circuitry 401 may include one or more of a general-purpose processor (e.g., MIPS processors, x86 processors, ARM-based processors, etc.), a Field-Programmable Gate Array, an application-specific integrated circuit (ASIC), a graphical processing unit (GPU), a central processing unit (CPU), and/or any other suitable type of processing circuitry. The communications interface 402 may include an Ethernet communications interface, an InfiniBand (IB) communications interface, an 802.11 communications interface and/or any other suitable type of communications interface. The memory 403 may include any suitable type of volatile and/or non-volatile memory, such as a random-access memory (RAM), a solid-state drive (SSD), a hard disk (HD), a flash memory, etc. Although in the present example the messaging platform 230 is depicted as an integrated device, it will be understood that alternative implementations are possible in which the messaging platform 230 is implemented as a distributed system including a plurality of devices that are connected to one another via a communications network. In such instances, each device that is part of the distributed system may include a separate processing circuitry, a separate memory, and a separate communications interface. Stated succinctly, the present disclosure is not limited to any specific implementation of the messaging platform.

According to aspects of the disclosure, the messaging platform 230 may include any suitable type of device or system that is configured to receive messages from a first set of computing units and forward the received messages to a second set of computing units. In some implementations, the messaging platform 230 may provide one or more channels (e.g., logical channels) that are used for the receipt of messages the first set of computing units and forwarding the messages to the second computing units. Providing any of the channels by the messaging platform 230 may include receiving messages on the channel from computing units registered as publishers on the channel and forwarding the messages to computing units that are registered on the same channel as subscribers. Additionally or alternatively, in some implementations, a message may be considered to be received on a given channel if the message includes (or is otherwise accompanied by) an identifier referencing the given channel as one on which the message is being transmitted over.

According to aspects of the disclosure, the messaging platform 230 may utilize a broker 404 to provide channels. In the example of FIG. 4A, the broker 404 includes one or more machine-readable instructions stored in the memory 403. However, although in the present example the broker 404 is implemented in software, alternative implementations are possible in which the broker 404 is implemented in hardware (that is part of the messaging platform 230) or as a combination of software and hardware.

In some implementations, the broker 404 may be configured to manage various state information as well as the execution of operations related to the receipt and forwarding of messages along a specified set of channels. By way of example, such operations may include registration of publishers, channels, subscribers and subscription of subscribers to channels, and providing an interface for interacting with the messaging platform 230. (e.g., a user interface, an administrator interface, or an interface of the computing units 210 and/or 220). In some implementations, the broker 404 may manage a set of "events" that need to be executed at each point of time, which may include primarily messages published by publishers but not yet relayed. The broker 404 may execute these events by first relaying the messages to appropriate subscribers depending on the channel topology and/or subscription topology, by executing the callback functions 340 at each subscriber that received a new message and updating the "event queue" upon successful completion. The broker provides interface for computing units 210 and/or 220 that are registered as publishers on a channel to publish a message to a channel—i.e. create an event. From an end user's perspective, an example of the interfaces (or function calls) that the broker 404 may expose are as follows:

Registration
    Publisher(publisher id): register publisher id as publisher.
    Channel(channel id): register channel id as channel.
    Subscriber(subscriber id, callback function): register subscriber id as subscriber with associated callback function.
    Subscribe(channel id, subscriber id): subscribe subscriber id to channel id, i.e Sub(channel id)=Sub(channel id)∪{subscriber id}.

Publish
    Publish(publisher id, channel id, message): publish message on channel id from publisher publisher id.

Figure 4B:
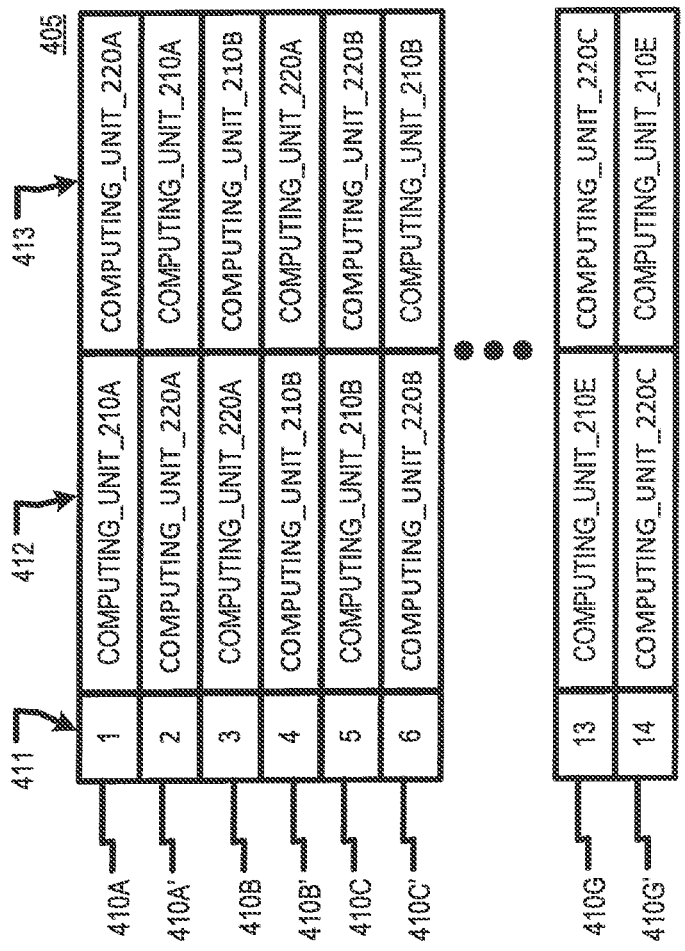
FIG. 4B is a diagram of an example of a channel map that is used by the messaging platform of FIG. 4A, according to aspects of the disclosure.
Figure 4C:
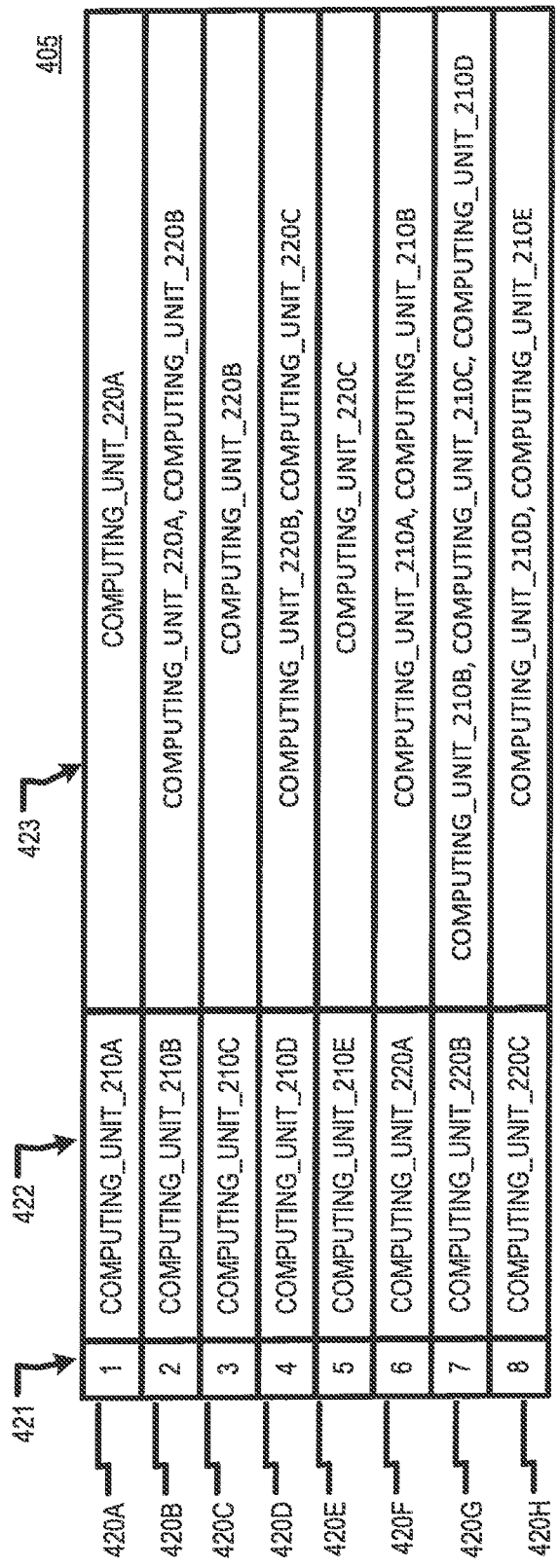
FIG. 4C is a diagram of another example of a channel map that is used by the messaging platform of FIG. 4A, according to aspects of the disclosure.

In some implementations, the messaging platform 230 may provide one or more channels by using a channel map 405. The channel map 405 may include any suitable type of data, data structure, or a plurality of data structures that can be used by the messaging platform to identify at least one of (1) one or more channels, (1) a computing unit that is registered as a publisher on any of the channels, and (3) a computing unit that is registered as a subscriber on any of the channels. FIG. 4B is a diagram illustrating one example implementation of the channel map 405, according to aspects of the disclosure. In the example of FIG. 4B, the channel map 405 is implemented as a table including a plurality of rows 410, wherein each row 410 represents a different channel that is provided by the messaging platform 230. Each row 410 includes a respective channel identifier 411, an identifier 412 of a computing unit 210 and/or 220 that is registered as a publisher on the channel, and an identifier 413 of a computing unit 210 and/or 220 that is registered as a subscriber on the channel. FIG. 4C is a diagram illustrating another example implementation of the channel map 405, according to aspects of the disclosure. In the example of FIG. 4C, the channel map 405 is implemented as a table including a plurality of rows 420, wherein each row 420 represents a different channel that is provided by the messaging platform 230. Each row 420 includes a respective channel identifier 421, a respective identifier 422 of a computing unit 210 and/or 220 that is registered as a subscriber on the channel, and an identifier 423 of computing unit(s) 210 and/or 220 that are registered as subscribers on the channel. In some implementations, the implementations shown in FIGS. 4B and 4C may differ from one another in that in the implementation of FIG. 4B each channel has only one publisher registered on it, whereas in the implementations of FIG. 4C each channel can have one or more (e.g., multiple) publishers that are registered on it.

In some implementations, the channel map 405 may be generated based on a node map 406 and/or a graph definition 510 (shown in FIG. 5) that is identified by the graph-based program 110. As is further discussed below, the graph definition 510 may define a graph 600 (shown in FIG. 6). In some implementations, the graph 600 may be a bipartite graph. In some implementations, the channels represented by the channel map 405 may define a topology that matches a topology of the graph 600. More particularly, in one example, the topology defined by the channels may be the same as the topology of the graph 600. In some implementation, the topology of the graph 600 may be considered the same as the topology of the channels represented by the channel map 405 if for each edge in the graph that connects one node 610 to another node 620, there exists a channel in which a respective computing unit 210 associated with the node 610 is registered as one of a publisher or subscriber and a respective computing unit 220, that is associated with the node 620, is registered as the other one of a publisher or subscriber.

Figure 4D:
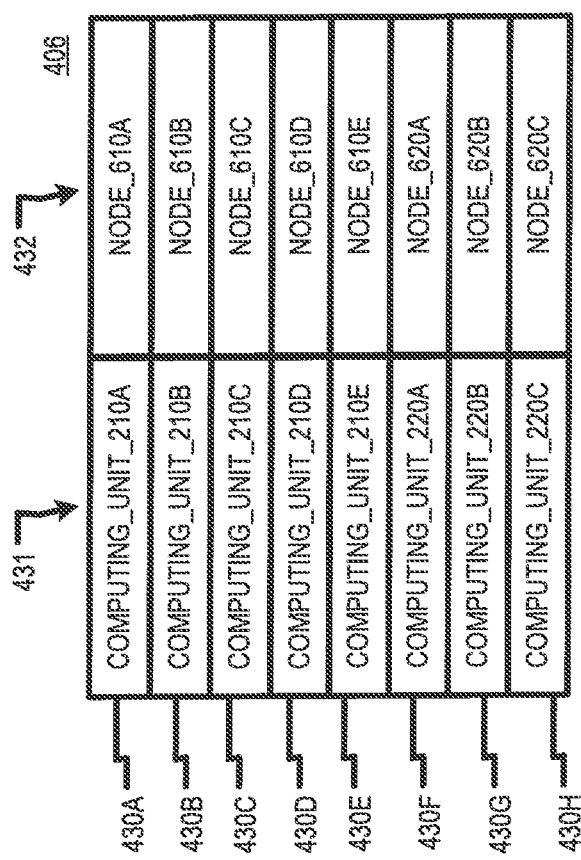
FIG. 4D is a diagram of an example of a node map that is utilized by the messaging platform of FIG. 4A, according to aspects of the disclosure.

FIG. 4D is a diagram illustrating an example of the node map 406, according to aspects of the disclosure. In the example of FIG. 4D, the node map 406 is implemented as a table including a plurality of rows 430. Each row 430 includes a respective computing unit identifier 431 and a respective node identifier 432 that identifies a node that is associated with the computing unit. As is further discussed below, the node map 406 may be used to associate the computing units 210 and 220 with different nodes 610/620 in the graph 600 that is part of the graph-based program 110. As is further described below, in some implementations, the node map 406 may be used to provide to each of the computing units 210 and 220 with one or more update functions that correspond to the node associated with the computing units (and/or the computing unit's corresponding graph nodes 610/620). According to the present example, each of the computing units 210 is associated with a different node 610, and each of the computing units 220 is associated with a different node 620. Although in the present example the node map 406 is depicted as a table, it will be understood that the node map 406 may be depicted using any suitable type of data structure or set of data structures.

Referring back to FIG. 4B, in the example implementation of channel map 405 shown in FIG. 4B, any edge in the graph 600 that connects one node to another is represented by a respective pair of channels, such that each channel in the pair represents a different direction in which messages can travel along the edge. For example, edge 630A is represented by the channels defined in rows 410A and 410A' of the channel map 405; edge 630B is represented by the channels defined in rows 410B and 410B' of the channel map 405; edge 630C is represented by the channels defined in rows 410C and 410C' of the channel map 405; and edge 630G is represented by the channels defined in rows 410G and 410G' of the channel map 405.

Referring back to FIG. 4C, in the example implementation of channel map 405 shown in FIG. 4C, each given computing unit 210/220 is registered as a subscriber in only one channel, and all remaining computing units 210/220 that represent nodes 610/620 connected to the node associated with the given computing unit 210/220 are registered as publishers on that channel. According to aspects of the disclosure, the implementation of the channel map 405 which is shown in FIG. 4C is advantageous over the implementation of FIG. 4B as the former includes fewer channel definitions than the implementation of FIG. 4C, thereby resulting in improved scalability.

In operation, as noted above, the messaging platform 230 may be configured receive messages over any of the channels defined by the channel map 405 from computing units that are registered as publishers on the channel and relay the messages to one or more computing units that are registered as a subscribers on the same channel. In some implementations, the messaging platform 230 may have a Publish Subscribe (PubSub) architecture. An example of one particular implementation of a PubSub architecture is provided further below.

Figure 5:
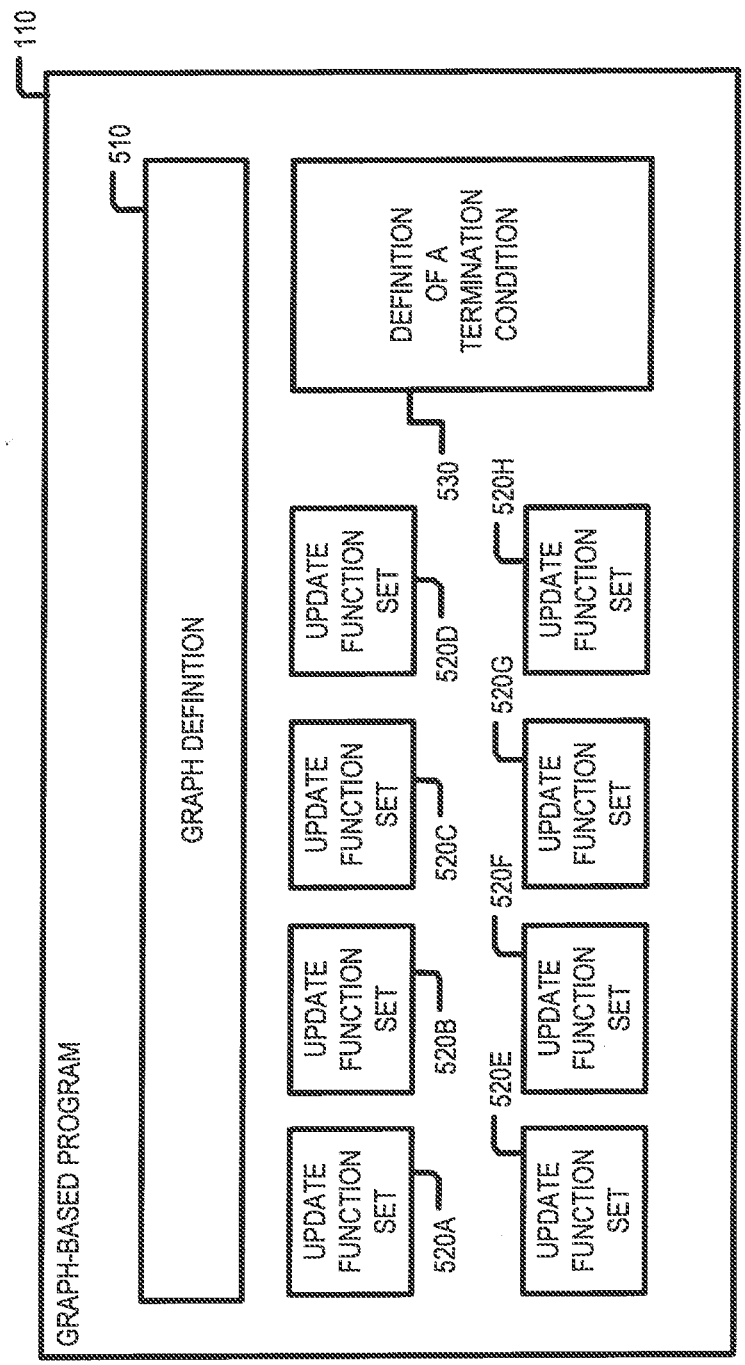
FIG. 5 is a diagram of an example of a graph-based program that is executed by the computing system of claim 1, according to aspects of the disclosure.

FIG. 5 shows an example of the graph-based program 110, according to aspects of the disclosure. As illustrated, the graph-based program 110 includes a graph definition 510, a plurality of update function sets 520, and a termination condition 530. The graph definition 510 may include one or more data structures that define a bipartite graph. Each update function set 520 may include one or more update functions. In some implementations, each update function set 520 may be associated with a different node in the graph represented by the graph definition 510, and/or executed by a different computing unit. In some implementations, the update functions in a given one of the function sets 520 may be associated with one of the nodes in graph represented by the graph-definition, such that when the graph-based program 110 is loaded onto the computing system 100, the update functions in the given function set 520 are all uploaded onto a computing unit associated with the node, to be executed by that computing unit. The termination condition 530 may include any suitable type of data structure or data structures that identify a condition (e.g., expression or rule) specifying when the graph-based program 110 should stop executing. For example, the termination condition may specify that the program should stop executing after a predetermined number of messages is transmitted from a specified node/computing unit. Additionally or alternatively, the termination condition may specify that the program should stop executing after a message is generated, by a specified node, that includes a data set having one or more predetermined characteristics (e.g., a data set having a specified distribution, a data set having a specified mean value, a data set having a specified standard deviation, a data set having a specified size, etc.). Additionally or alternatively, in some implementations, the termination condition 530 may specify what would be the final result of the execution of the graph-based program 110. For example, in some implementations, the termination condition may specify that the final result is a predetermined message (or data contained in the message) that is generated by a specific node/computing unit. For instance, the termination condition 530 may specify that the final condition is the $10^{th}$ message generated by the computing unit associated with graph node 610A during the execution of the graph-based program 110. Additionally or alternatively, the termination condition 530 may include one or more machine-readable instructions which when executed by the messaging platform 230 to combine data contained in two different messages originating from different computing units/nodes to produce the final result.

Figure 6B:
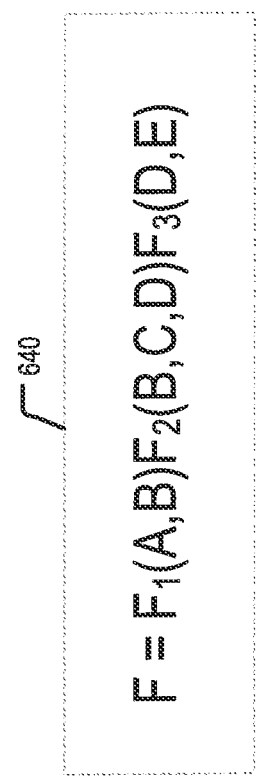
FIG. 6B is a diagram of a mathematical model which the program of FIG. 5 is configured to execute, and which is represented by the bipartite graph of FIG. 6A, according to aspects of the disclosure.
Figure 6A:
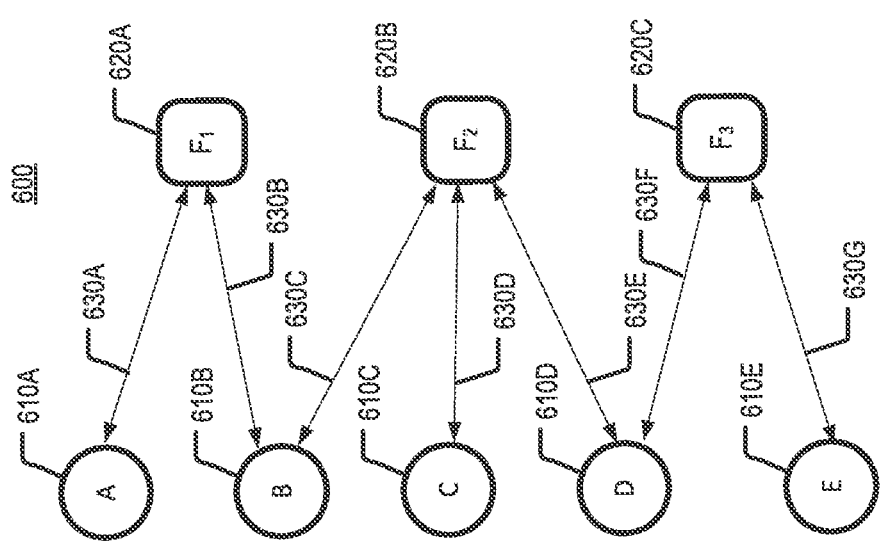
FIG. 6A is a diagram of an example of a bipartite graph that is identified by the graph-based program of FIG. 5, according to aspects of the disclosure.

FIG. 6A is a diagram of an example of a graph 600 that is defined by the graph definition 510. As illustrated, the graph 600 may be a factor graph having a plurality of nodes 610, a plurality of nodes 620, and a plurality of edges, wherein each of the edges connects one of the nodes 610 to one of the nodes 620. According to the present disclosure, the graph 600 represents at least a portion of a model 640, an example of which is shown in FIG. 6B. Although in the present example, the graph 600 is a factor graph, it will be understood that alternative implementations are possible in which the graph 600 is any suitable type of bipartite graph.

Figure 7:
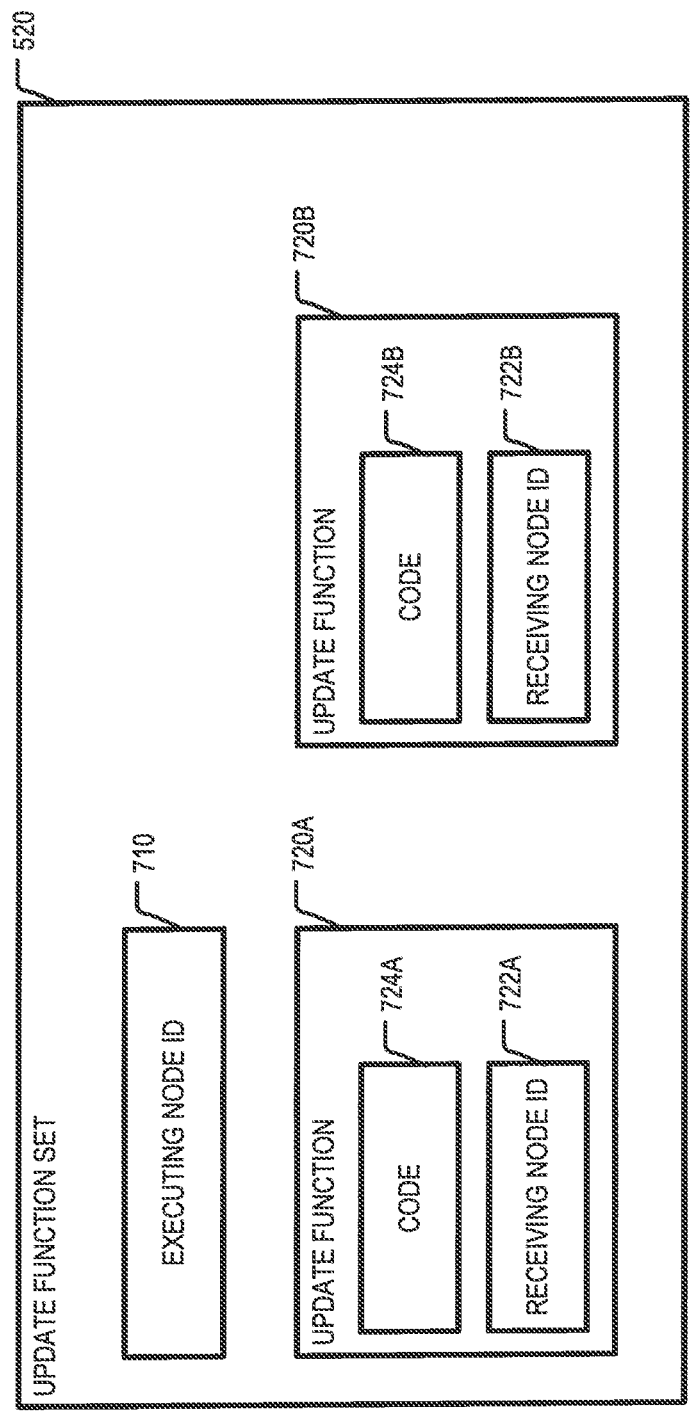
FIG. 7 is a diagram of an update function set that is identified by the graph-based program of FIG. 5, according to aspects of the disclosure.

FIG. 7 shows an example of an update function set 520, which as the numbering suggests, is representative of any of the update function sets 520A-H. In the present example, the update function set 520 includes an executing node identifier 710 and update functions 720A and 720B. Although in the present example, the update function set is depicted as including multiple update functions, it will be understood that alternative implementations are possible in which the update function set includes only one update function 720.

The executing identifier 710 may identify either implicitly or explicitly a computing unit that is to execute the update functions 720 in the update function set. In some implementations, the executing identifier 710 may include a MAC address of a computing unit that is to execute the update functions. In some implementations, the executing identifier 710 may include a node identifier that identifies one of the nodes 610 or 620 in the graph 600, which can be used, together with the node map 406, to identify a computing unit that is to execute the update functions 720 in the update function set 520.

Each of the update functions 720 may include a recipient node identifier 722 and a code block 724. The recipient node identifier 722 of each update function 720 may identify either implicitly or explicitly a computing unit that is to receive data that is produced as a result of executing the code 724 that is part of the same update function 720. In some implementations, the recipient node identifier 722 may include a MAC address of a computing unit that is designated to receive at least some of data that is generated by the update function. In some implementations, the recipient node identifier 722 may include a node identifier that identifies one of the nodes 610 or 620 in the graph 600, which can be used, together with the node map 406, to identify a computing unit that is to execute the update functions 720 in the update function set 520. Additionally or alternatively, in some implementations, the recipient node identifier 722 may include a channel identifier that identifies a channel on which the at least some of data that is generated by the update function 720 is to be published (e.g., transmitted over).

Each code block 724 may include one or more machine-readable instructions. In some implementations, at least one code block 724 may include high-level code (e.g., text) which is to be compiled on the computing unit executing the code. Additionally or alternatively, in some implementations, at least one code block may include bit code that is to be interpreted on the computing unit executing the code. Additionally or alternatively, in some implementations, at least one code block 724 may include machine-language code that can be executed without any further compilation or interpretation.

In some implementations, each update function 720 in any given update function set 520 may identify a different recipient node/recipient computing unit than the other update functions in the same set. Additionally or alternatively, each update function 720 in any given update function set 520 may be executed based on messages that are received from a specific computing unit/node. For example, a first proper subset of the update function set 720 may include functions that are executed based on message(s) that are received from one computing unit/node, such that the output of each of the update functions in the subset is provided to a different recipient computing unit/node. In the same example, a second proper subset of the update function set 520 may include update functions 720 that are executed based on message(s) that are received from another computing unit/node such that the output of each of the update functions in the subset is provided to a different recipient computing unit/node. Put differently, in some implementations, each update function 720 in a given update function set 520 may be associated with a different pair of source and destination computing unit(s)/node(s), such that the update function 720 is executed based only on messages that are generated by the source computing unit/node, and the messages produced by the update function 720 are transmitted only to the destination computing unit/node. Alternatively, in some implementations, at least one of the update functions 520 may be executed based on messages received from different computing units/nodes, and the output of the function can be provided to different computing units/nodes. Stated succinctly, the present disclosure is not limited to any specific configuration of the update functions 720.

It will be further understood, that the present disclosure is not limited to any specific way of representing the update functions 720 in any update function set. Although FIG. 7 depicts the update functions 720 as encapsulated in the same data structure, alternative implementations are possible in which the update functions 720 are stored independently of one another. Furthermore, although each recipient node identifier 722 and code 724 of any of the update functions 720 are depicted as being encapsulated in the same data structure, alternative implementations are possible in which the recipient node identifier 722 and the code 724 that are part of an update function are stored independently of one another. Furthermore, although FIG. 5 depicts the graph-based program 110 as including discrete update function sets, alternative implementations are possible in which all update functions may be provided in the same update function set along with information identifying one or more nodes/computing units that are designated to execute each of the functions.

Figure 8:
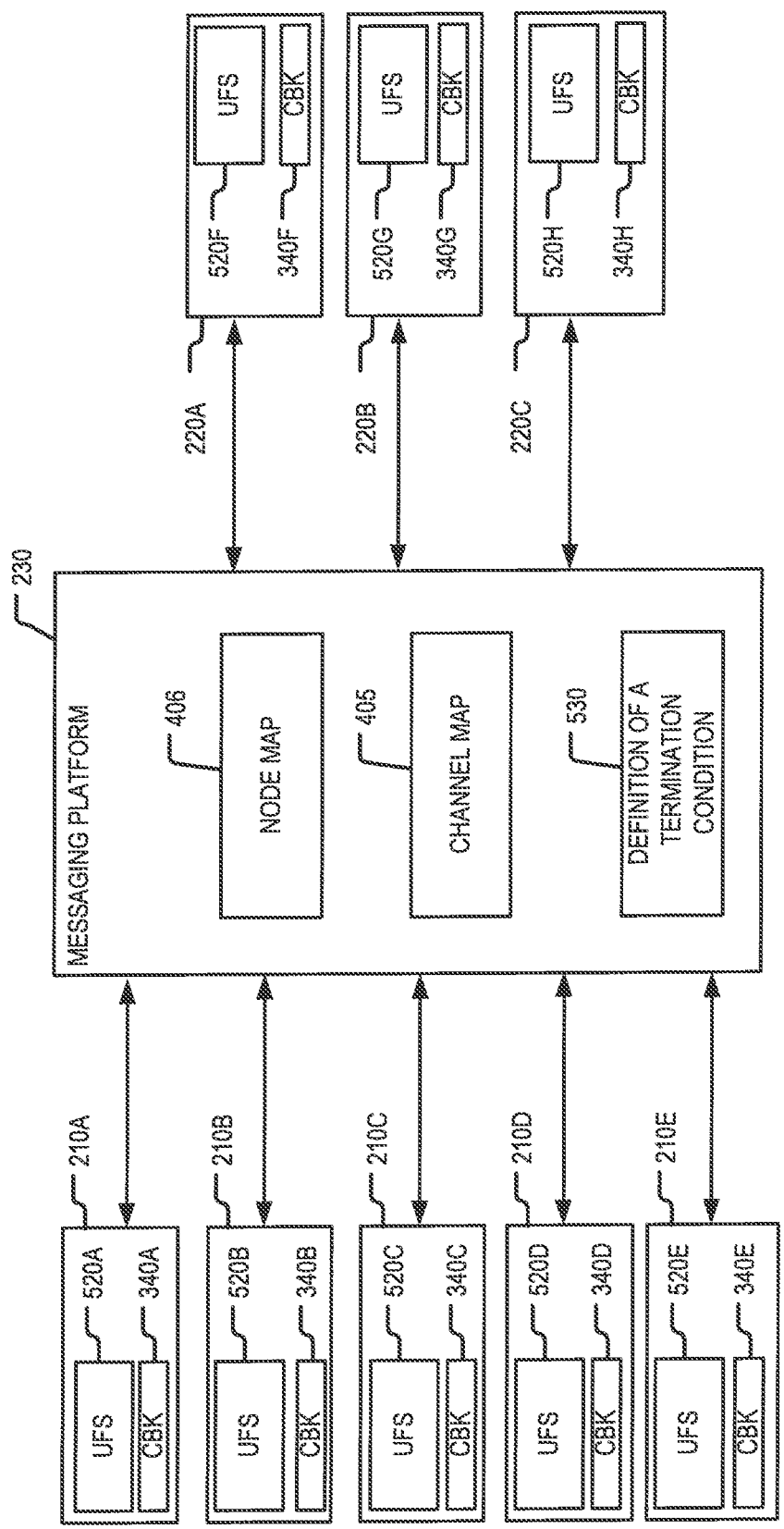
FIG. 8 is a diagram illustrating the state of the computing system of FIG. 1 after the computing system has been configured to execute the graph-based program of FIG. 5, according to aspects of the disclosure.

FIG. 8 is a diagram of the system 100 after the system 100 has been configured to execute the graph-based program 110. Configuring the system 100 may include one or more of (i) generating the node map 406 that maps different computing units 210/220 to respective nodes 610/620, (ii) generating the channel map 405 to instantiate channels between the computing units 210/220 based on the topology of the graph 600, and (iii) providing to each computing unit a respective update function set 520 that includes an executing node identifier 710 that identifies the computing unit.

According to aspects of the disclosure, generating the node map 406 may result in each of the computing units 210/220 being associated with a different one of the nodes. As noted above, in some implementations, the graph-based program 110 may associate each of the computing units 210 and 220 with a different update function set 520 by including a respective executing node identifier 710 in the update function set 520. In this regard, the node map 406 may be used to determine which computing unit 210/220 should be provided with which update function set 520. Additionally or alternatively, the node map 406 may be used to translate node identifiers that are present in the graph-based program 110 to respective identifiers of computing units that are tasked to carry the functions ascribed to individual nodes in the graph 600 (by the graph-based program 110).

According to aspects of the disclosure, generating the channel map 405 may result in a channel fabric being created that matches the topology of the graph 600. As noted above, each of the channels may connect one or more pairs of computing units. Each pair may include one of the computing units 210 and one of the computing units 220. One of the computing units in the pair may be registered as a publisher on the channel, and the other of the computing units in the pair may be registered as a subscriber on the channel. In the present example, the computing units in each pair may be mapped, by the node map 406, to nodes in the graph 600 that are neighbors (e.g., nodes that are directly connected to one another by an edge).

According to aspects of the disclosure, in some implementations, providing any computing unit with a respective update function set may include uploading the function set to the computing unit. Additionally or alternatively, in some implementations, providing any computing unit with a respective update function set may include storing the update function set in a memory space of the computing unit. Additionally or alternatively, in some implementations, update functions may be present natively in the computing units 210 and 220. In such instances, providing any computing unit with a respective update function set may include providing the computing unit with metadata that includes one or more rules that specify the time and manner in which one or more natively available update functions are to be executed. For example, such metadata may specified a respective pair of recipient and destination computing units/nodes for at least some of the natively-available update functions.

Figure 9:
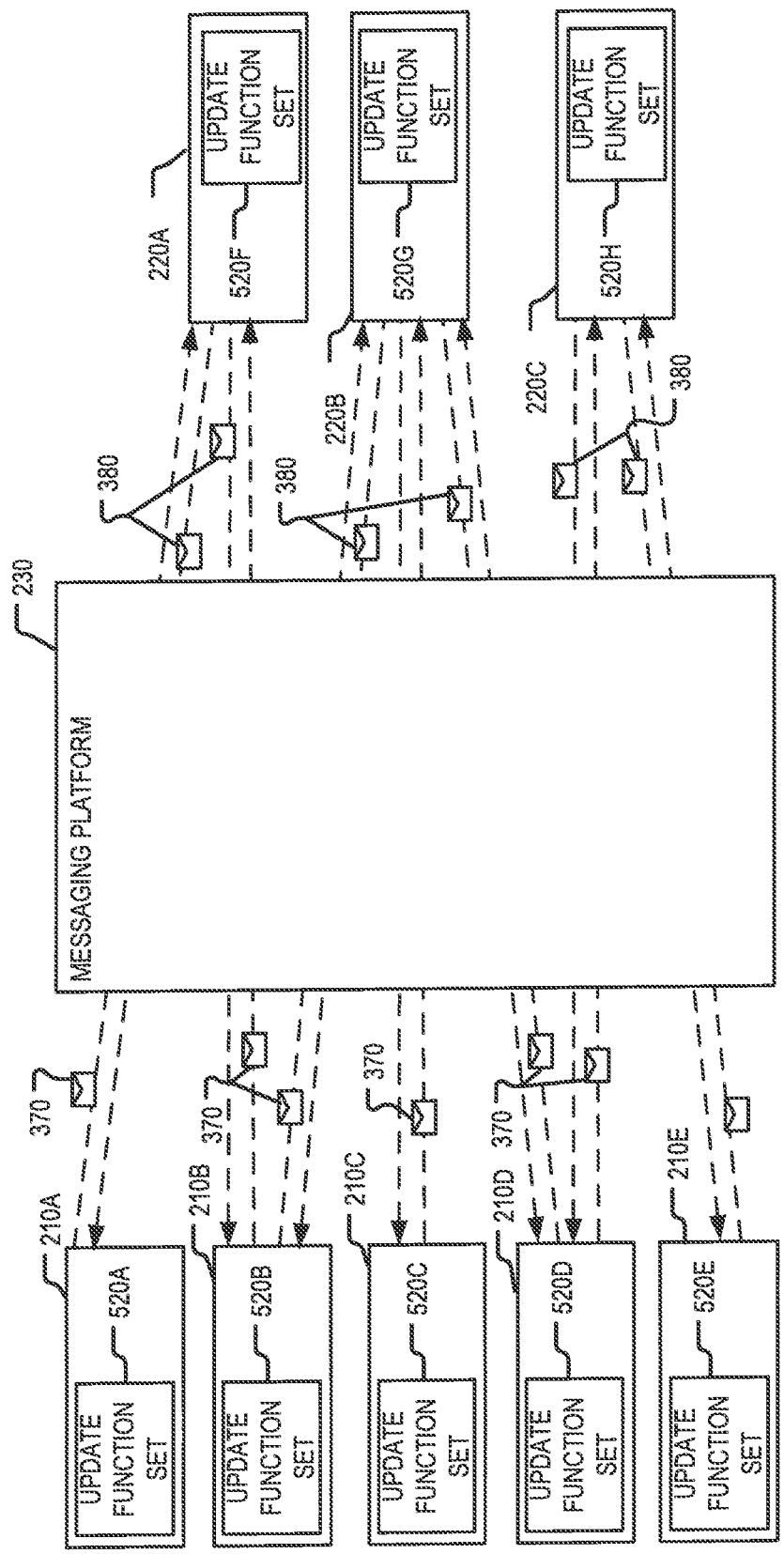
FIG. 9 is a diagram illustrating the operation of the computing system of FIG. 1, according aspects of the disclosure.

FIG. 9 is a diagram illustrating the operation of the computing system 100 during execution of the graph-based program 110. As illustrated, when the graph-based program 110 is executed, each of the computing units 210/220 may: (i) receive messages that are generated by other computing units 210/220, (ii) execute the update functions stored on the computing unit to generate new messages based on the received messages, and (iii) transmit the new messages to other computing units until the result 130 is produced. Each of the messages may include one or more data items that are generated by one of the computing units 210/220, and it may be transmitted along the channels defined by the node map 406. According to the present example, each of the computing units 210 receives messages that are generated by computing units 220, and each of the computing units 220 receives messages generated by computing units 210. Stated succinctly, according to the present example, the computing units 210 do not directly exchange messages among themselves, the computing units 210 do not directly exchange messages among themselves, either.

Figure 10:
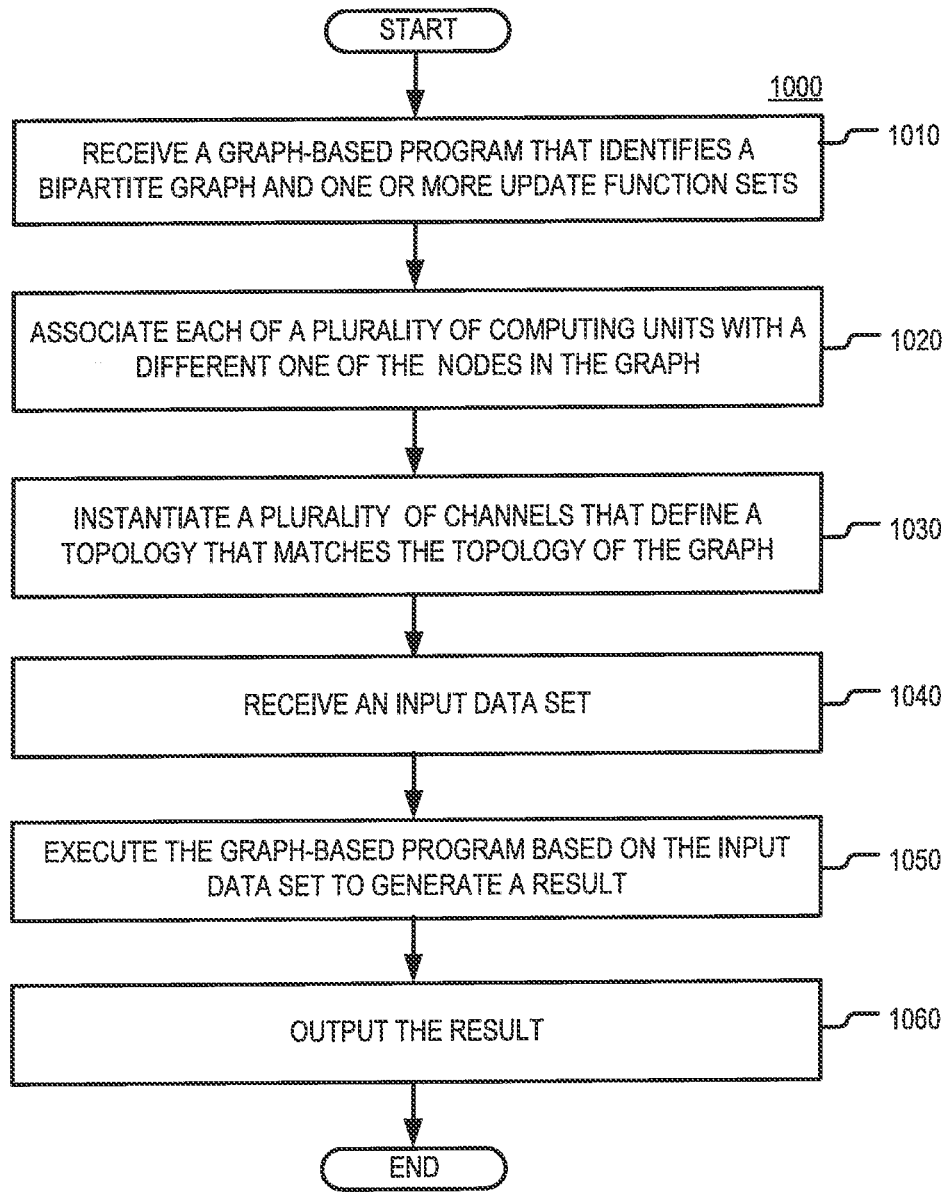
FIG. 10 is a flowchart of an example of a process, according to aspects of the disclosure.

FIG. 10 is a flowchart of an example of a process 1000 for executing a graph-based program, according to aspects of the disclosure.

At step 1010, a graph-based program is received at a messaging platform that identifies at least one of a bipartite graph, one or more update function sets, and a termination condition. In some implementations, the messaging platform may be the same or similar to the messaging platform 230. In some implementations, the graph-based program may be the same or similar to the graph-based program discussed with respect to FIGS. 1-9. In some implementations, the update function sets may define operations that are to be performed by one or more computing units, and the graph may identify an order in which the operations are to be performed. In some implementations, each update function set may be designated for execution by a different node in the graph. Additionally or alternatively, in some implementations, each of the update functions identified in the graph-based program may be designated for execution by a different node in the graph. In some implementations, at least one of a bipartite graph definition, one or more update function sets, and a termination condition may be contained within the graph-based program 110. Additionally or alternatively, in some implementations, the graph based program may include one or more identifiers that can be used to retrieve at least one of the bipartite graph definition, the one or more update function sets, and the termination condition from either a remote location or local memory.

At step 1020, each of a plurality of computing units is associated with a different one of the nodes in the graph. In some implementations, the computing units may be the same or similar to the computing units 210 and 220. In some implementations, associating the computing units with graph nodes may include generating a node map that this the same or similar to the node map 406, which is discussed with respect to FIG. 4A. Additionally or alternatively, associating any computing unit with a graph node may include providing the computing unit with an update function set including one or more update functions that are associated with the computing unit's corresponding node or the computing unit itself.

At step 1030, a plurality of channels is instantiated by the messaging platform. In some implementations, instantiating the plurality of channels may include generating a channel map that is the same or similar to the channel map 405, which is discussed above with respect to FIG. 4A. In some implementations, the instantiated channel map may define a topology that is the same (or otherwise matches) the topology of the bipartite graph identified by the graph-based program.

At step 1040, an input data set is received. In some implementations, the input data set may be the same or similar to the input data set that is discussed with respect to FIG. 1.

At step 1050, the graph-based program is executed by the messaging platform and the computing units to obtain a result. In this regard, FIG. 11 provides an example of a process performed by the messaging platform over the course of executing the graph-based program and FIG. 12 provides an example of a process that is performed by the computing units over the course of executing the graph-based program.

At step 1060, the generated result is output. In some implementations, outputting the result may include transmitting the result over a communications network to a client device. Additionally or alternatively, in some implementations, outputting the result may include displaying the result on a display screen and/or rendering the result using an audio transducer, etc.

Figure 11:
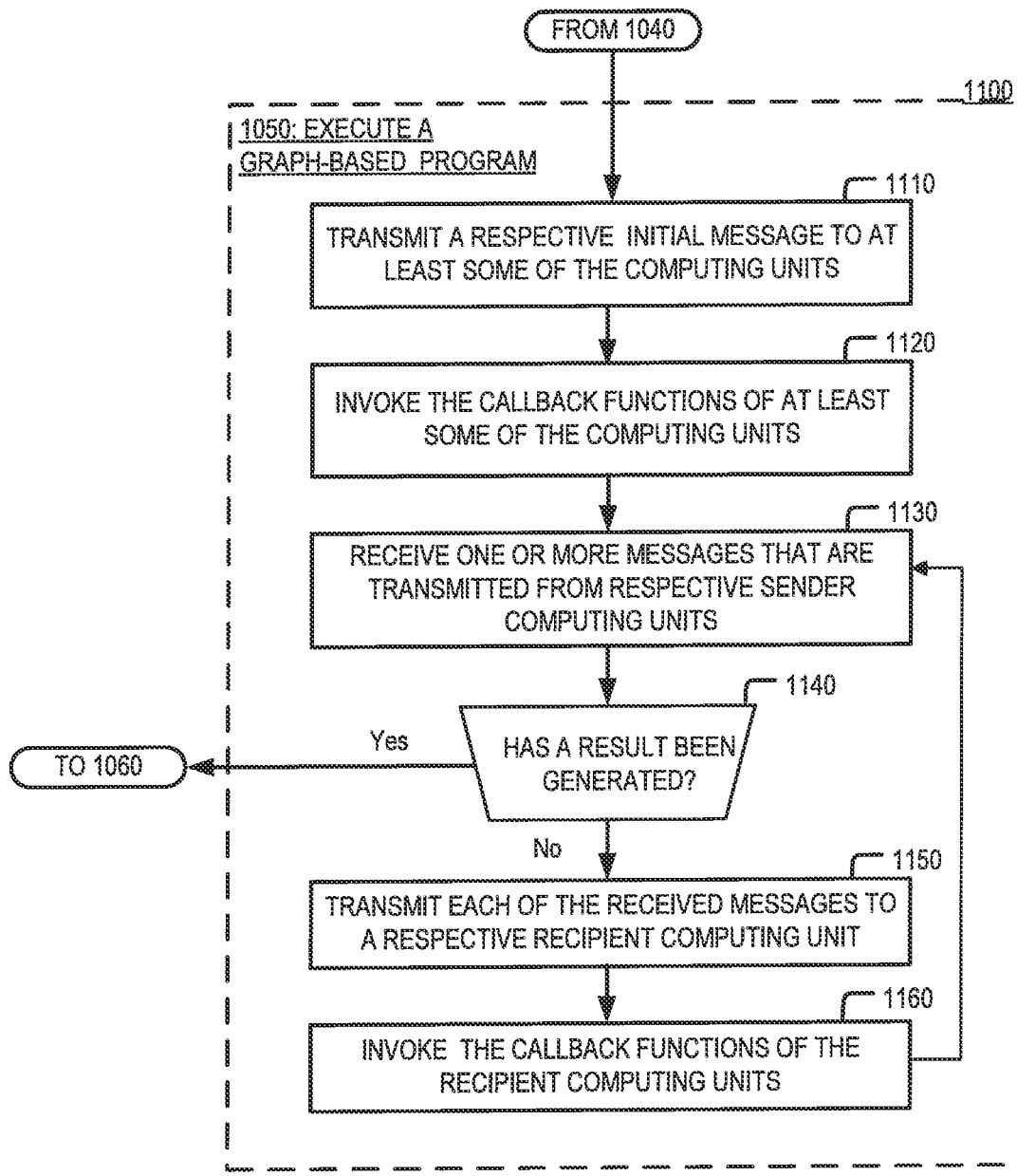
FIG. 11 is a flowchart of an example of a process associated with the process of FIG. 10, according to aspects of the disclosure.
Figure 12:
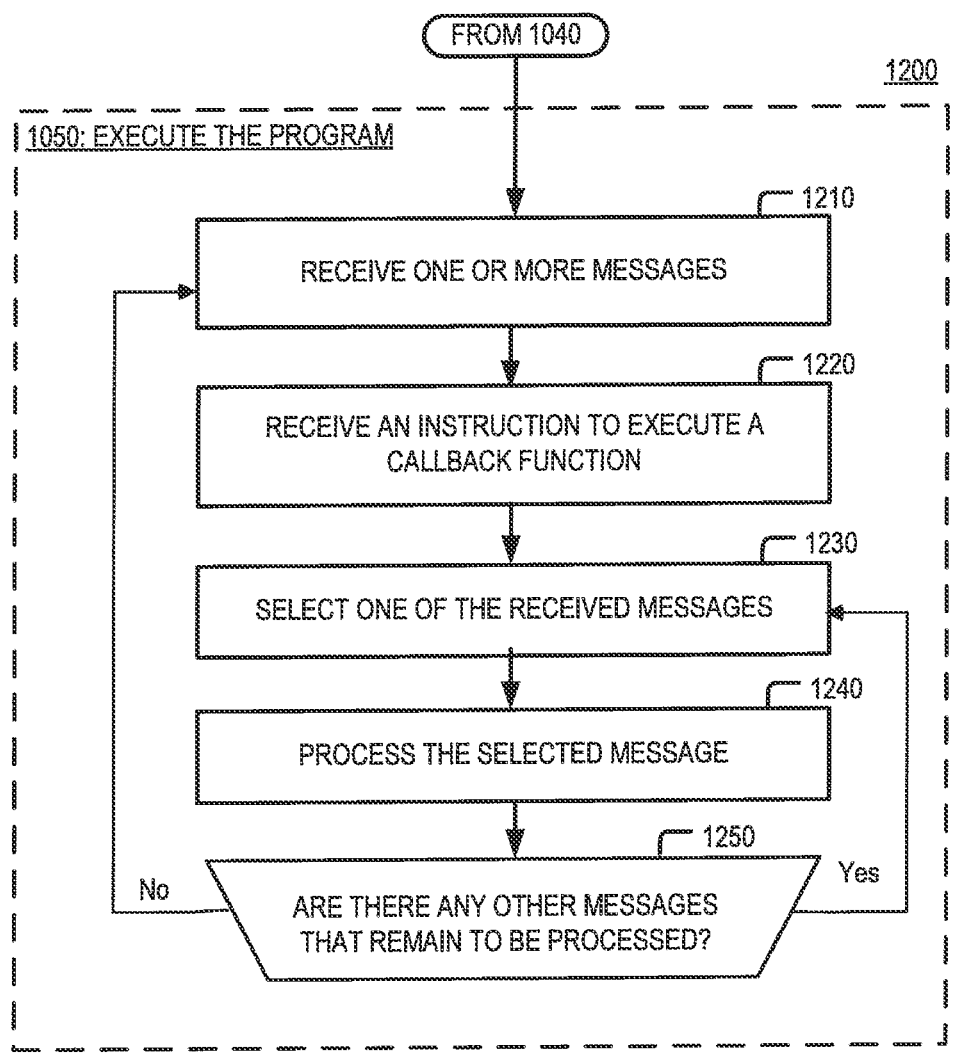
FIG. 12 is a flowchart of an example of a process associated with the process of FIG. 10, according to aspects of the disclosure.

FIG. 11 is a flowchart of an example of process 1100 for executing a graph-based program by a messaging platform in a computing system that includes the messaging platform and a plurality of computing units, as specified by step 1050 of the process 1000. At step 1110, a respective initial message is transmitted to each (or at least some) of the computing units in the computing system. In some implementations, the initial messages may be generated based on the input data set received at step 1040. For example, in some implementations, each of the initial messages may include a portion of the input data set. At step 1120, a respective callback function of each of the computing unit is invoked. In some implementations, invoking the callback function of any of the computing units may include transmitting to the computing unit a message, which when received by the computing unit causes the computing unit to execute its respective callback function. At step 1130, one or more messages are received by the messaging platform. In some implementations, each of the messages may be received over one of the channels instantiated at step 1030 from a computing unit that is registered as a publisher on that channel. At step 1140, a determination is made whether a result can be generated based on the received messages. If the result can be generated, the process 1100 proceeds to step 1050. Otherwise, the process 1100 proceeds to step 1150.

At step 1150, each of the received messages is transmitted to its respective destination. In some implementations, transmitting any message to its respective destination may include transmitting the message to a computing unit that is registered as a subscriber on a channel over which the message is received. In some implementations, step 1150 may be performed synchronously. Additionally or alternatively in some implementations, step 1150 may be performed asynchronously. When step 1150 is performed synchronously, the messages in any batch of messages (e.g., a plurality of messages) received by the messaging platform during any of a plurality of consecutive first time periods are transmitted concurrently to their respective destination(s). In some implementations, the batch of messages may be considered to be transmitted concurrently, when the entire batch of messages is transmitted within the duration of a second time period that temporally overlaps with one or more of the first time periods, and is shorter in duration than each (or at least one) of the first time periods.

At step 1160, the respective callback function of each of the plurality of computing units is invoked. As is discussed further below, executing the callback function of any given computing unit may cause the computing unit to execute one or more update functions based on messages received at the computing unit.

FIG. 12 is a flowchart of an example of process 1200 for executing a graph-based program by any one of a plurality of computing units in a computing system that includes the messaging platform and the plurality of computing units, as specified by step 1050 of the process 1000. At step 1210, a computing unit receives one or more messages from the messaging platform discussed with respect to FIG. 10. The messages may be received over any one of the plurality of channels instantiated at step 1030, which the computing unit is registered as a subscriber on. At step 1220, an instruction is received to execute a callback function that is provided in the computing unit, and the callback function is executed in response. According to the present disclosure, executing the callback function causes the computing unit 210 to process each of the messages received at step 1210. Although in the present example the execution of steps 1230-1250 is triggered by a callback function running on the computing unit, it will be understood that alternative implementations are possible in which the execution of steps 1230-1250 is triggered by a prompt or a set of prompts that are unrelated to any callback function. At step 1230, one of the received messages is selected. At step 1240, the selected message is processed. At step 1250, a determination is made if there are any more messages that remain to be processed. If there are messages that remain to be processed, the process 1200 returns to step 1230 where another one of the received messages is selected processing. If no there are no messages the messages that remain to process, the process returns to step 1210 where it waits for more messages to be received. In some implementations, the process 1200 may be performed for as long as the computing unit continues to receive messages from the messaging platform.

Figure 13:
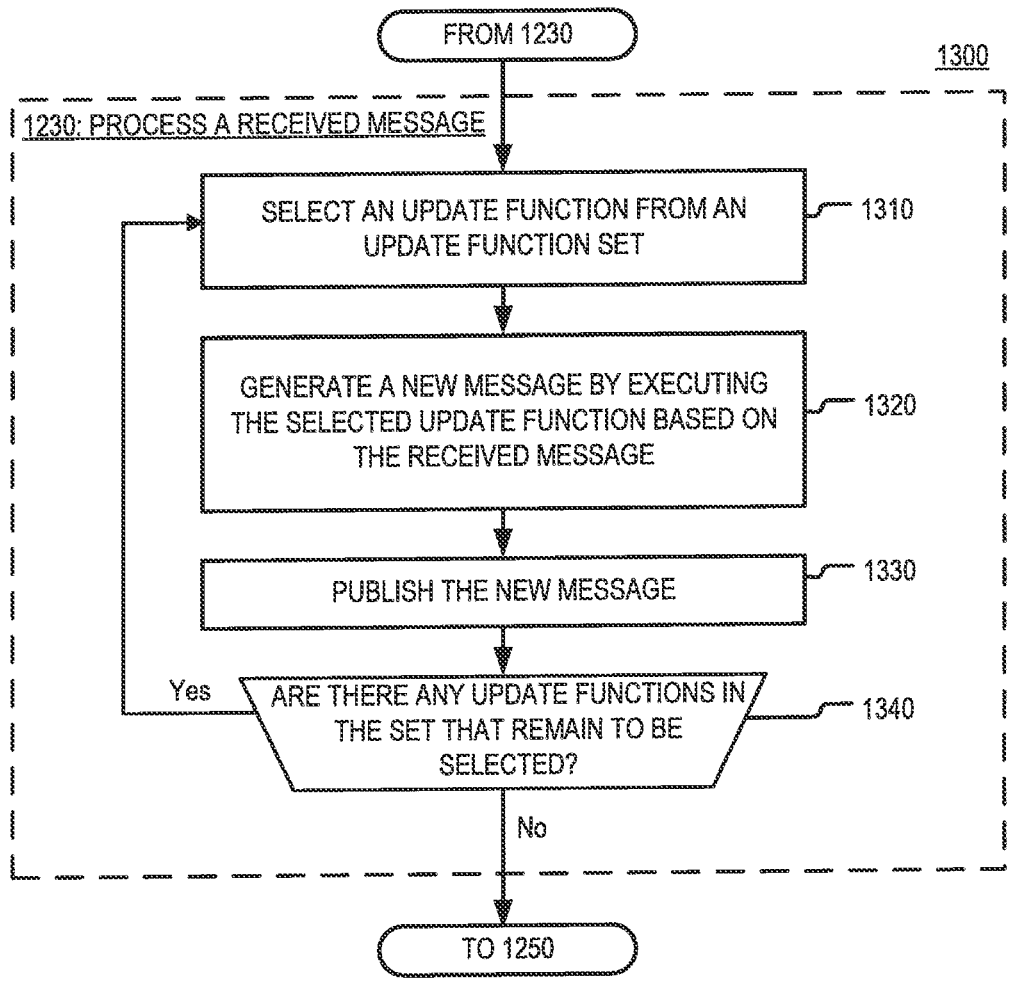
FIG. 13 is a flowchart of an example of a process associated with the process of FIG. 10, according to aspects of the disclosure.

FIG. 13 is a flowchart of an example of a process 1300 for processing a received message, as specified by step 1240 of the process 1200. At step 1310, one of a plurality of update functions that are provided to the computing unit at step 1020 is selected. At step 1320, the selected update function is executed using at least a portion of the received message as input to the selected function to produce a new message. At step 1330, the new message is published on a channel associated with the update function for transmission to a computing unit that is designated as a receiving node for that function. In some implementations, the new message may be published on a channel which the designated computing unit is registered as a subscriber on, and on which the computing unit executing the process 1300 is registered as a publisher. In some implementations, publishing the message may include transmitting the message to the messaging platform for forwarding to the designated computing unit. At step 1340, a determination is made if there are any update functions that remain to be selected. If there are update functions in the set that have not been selected yet, the process returns to step 1310 where a new update function is selected. If there are no more update functions to be selected, the process proceeds to step 1250.

The discussion of FIGS. 1-13 is provided as an example. At least some of the steps discussed with respect to the processes of FIGS. 10-13 can be performed in a different order, performed concurrently, or altogether omitted. As used throughout the disclosure, the term "machine-readable" refers to instructions that can be both read and executed by a processing circuitry of a machine.

Example of a Language for Graph-Based Computing

The discussion of FIGS. 1-13 provides examples of graph-based program(s) written in a graph-based language for graph-based computing. The graph-based based language (or programs written in the graph-based language) can be implemented in a number of ways. For example, in some implementations, the graph-based language may utilize a representation of a bipartite graph. Additionally or alternatively, in some implementations, the graph-based language may utilize a representation of a factor graph. As another example, graph-based programs written in the graph-based language may be executed synchronously or asynchronously. Notably, synchronous implementations of the graph-based language that are based on a factor graph are shown herein to be Turning-complete. However, it will be understood that the examples of graph-based language implementations (and/or graph-based programs) provided throughout the disclosure, are not limited to any specific type of graph and/or any specific mode of computation.

As noted above, in some implementations, the graph-based language may rely on a definition of a factor graph to perform computations. As is discussed with respect to FIG. 14, such graph is a universal representation for any probabilistic graphical model. And therefore, it allows representation of any Boolean formulae such as 3-SAT. Generally, such a factor graph has been used to derive heuristic algorithms like Belief Propagation. Therefore, the classical view does not provide a computationally powerful implementation. For example, it is known that Belief Propagation is limited by Linear Programming relaxation for the maximum weight independent set. However, by viewing the factor graph in generality rather than restricting to belief propagation like algorithms only, the present disclosure proves it can lead to a Turing complete language. One example implementation of the graph-based language can be described in terms of the following entities:

Graph.

Programs written in the graph-based language identify a factor graph $G=(V, F, E)$ which is a bipartite graph where $V=\{v1, \ldots, vn\}$ is the set of variable nodes, $F=\{f1, \ldots, fm\}$ is the set of factor nodes, and $E \subset V \times F$ denote the set of undirected edges between variable nodes V and factor nodes F.

States, Messages.

According to the present example, Q denotes the set of rational numbers. Each variable node $v \in V$ has finite dimensional state $xv \in Q^{pv}$ associated with it for some $pv \geq 1$; each factor node $f \in F$ has finite dimensional state $yf \in Q^{pf}$ associated with it for some $pf \geq 1$. Each variable node $v \in V$ has message-update function UpdateVarv: $Q^{av} \times F \rightarrow Q^{bv}$ associated with it; each factor node $f \in F$ has message-update function UpdateFacf: $Q^{af} \times V \rightarrow Q^{bf}$ associated with it. Here av,bv for any $v \in V$ and af,bf for any $f \in F$ are such that $av=pv+X \ \partial \in N(v)b\partial$, $af=pf+Xu \in N(f)bu$. where $N(v)=\{\partial:(v,\partial) \in E\}$ represents neighbors of v and $N(f)=\{u:(u,f) \in E\}$ represents incoming neighbors of f in the factor graph G with respect to E. Each edge $(v,f) \in E$ with $v \in V, f \in F$ has two message associated with it, for both directions: message $mv \rightarrow f \in Q^{bv}$ is from variable node $v \in V$ to factor node $f \in F$ and message $mf \in v \in Q^{bf}$ in the opposite direction.

Computation Dynamics.

During the execution a graph-based program written in the graph-based language, messages are allowed to be updated dynamically using other messages or states. However, states associated with variable or factor nodes are allowed to be updated only as an "external" input. In that sense, messages are the only truly dynamic data structures that needs "communication" along edges E of Factor Graph. The messages are updated in a specific manner. Precisely, for any $(f,v) \in E$ with $f \in F, v \in V$, message $mf \rightarrow v$ is updated as $mf \rightarrow v=$UpdateFacf $(yf;mu \rightarrow f,u \in N(f);v)$; (1) and for any $(v,f) \in E$ with $v \in V, f \in F, mv \rightarrow f$ is updated as $mv \rightarrow f=$UpdateVarv $(xv;m\partial \rightarrow v, \partial \in N(v);f)$. In this regard, explicitly having v as argument in UpdateFacf and f as argument in UpdateVarv, allows for flexibility to have different update function for different edges incident on each factor and variable node. UpdateFac and UpdateVar, according to the present example, are update functions that are executed on variable nodes and factor nodes, respectively (and/or respective computing units associated with the variable and factor nodes).

Modes of Computation.

In the asynchronous mode of computation, the message update along edge $(v,f) \in E$ for $v \in V, f \in F$ from $v \rightarrow f$ is triggered when any of the message $m\partial \rightarrow v$ for $\partial \in N(v)$ is updated; similarly, the message update along edge $(v,f) \in E$ for $v \in V, f \in F$ from $f \rightarrow v$ is triggered when any of the message $mu \rightarrow f$ for $u \in N(f)$ is updated. In the synchronous mode of the computation, in each time instance, all messages from variable nodes to factor nodes are updated simultaneously and then messages from factor nodes to variable nodes are updated simultaneously.

Output.

The output of the computation is viewed as the value associated with the messages. Specifically, the value of pre-designated subset of messages can be viewed the value of computation output at any given instance.

Example of an Architecture for Executing Graph-Based Programs

As discussed above, in some implementations, the graph-based programs written in the graph-based language can be executed by a messaging platform that is configured in accordance with a Publish Subscribe (PubSub) architecture. PubSub is a widely used software architecture for communicating "changes" between different entities at scale. A PubSub system may include Publishers and Subscribers who do not need to know about each others' existence and communicate by publishing/subscribing to pre-defined Channels. This decoupling of senders (Publishers) and receivers (Subscribers) through interface of communication channels has made it particularly suitable infrastructure for variety of applications and more so recently. This includes online gaming, chat systems, asynchronous event notifications, stream ingestion, and log processing. Different PubSub systems come with different guarantees and properties. These include exactly-once, at-most once, or at-least once delivery and processing. There are several implementations of PubSub available including Apache Kafka, Redis, Akka, and zeroMQ. Large scale and commercial implementations of PubSub systems include Google PubSub, Amazon Simple Notification Services, and Apache ActiveMQ. It will be understood that the present disclosure is not limited to any specific implementation of a PubSub architecture.

In some implementations, a PubSub architecture can be formally described as follows: Let $P=\{p1, \ldots, pm\}$ be set of publishers, $C=\{(c1, \ldots, cL\}$ be set of channels, and $S=\{s1, \ldots, sn\}$ be set of subscribers. Let $Sub(c) \subset S$ be set of subscribers that are subscribed to a given channel $c \in C$. A publisher $p \in P$ can publish to any channel $c \in C$. The primary dynamics in PubSub includes a publisher, say $p \in P$ publishing a "message" to a channel, say $c \in C$, which in turn gets relayed to all the subscribers $s \in Sub(c)$ which in turn triggers call-back function fs associated with the subscriber $s \in S$ with input as the "message" relayed as well as information about the publisher, channel.

Example of Using a Publish-Subscribe Architecture for Executing Graph-Based Programs In some implementations, a PubSub architecture may be used to execute graph-based programs written in the graph-based language. To that end, consider any graph-based computing setup as described above. Let $G=(V,F,E)$ be the factor graph with variable nodes $V=\{v1, \ldots, vn\}$, factor nodes $F=\{f1, \ldots, fm\}$, and edges $E \subset V \times F$. The present example assumes having access to a PubSub infrastructure with Registration and Publish interface.

Registration. Using Publisher, all variable and factor nodes are registered as publishers. That is, $P=V \cup F$. Using Subscriber, all variable and factor nodes are registered as subscribers. That is, $S=V \cup F$. The variable node $v \in V$ is subscribed with callback function CallbackVarv which primarily wraps around UpdateVarv. The factor node f∈F is subscribed with callback function CallbackFafj which primarily wraps around UpdateFacf (see FIG. 1 for precise definitions). For each edge (v,f)E, two channels are added: c(v→f),c(f→v). That is, C={c(v→f),c(f→v):(v,f)∈E}. Using Subscribe, associate subscriber corresponding to v∈V to all channels c(f→v),(v,f)∈E, and that corresponding to f∈F to all channels c(v→f),(v,f)∈E.

Dynamics. The primary dynamics in some implementations of graph-based computing correspond to implementing message updates as in some PubSub platforms that are available on the market, such as the Akka and Cilkplus platforms. The computation can be started off by all variable nodes sending default or initial messages to their neighboring factor nodes using the Publish interface, where publisher corresponding to v∈V publishes default message mv→f for each f∈N(v) on the channel c(v→f). In turn, PubSub system relays the messages to corresponding factor nodes. The factor node, say f, upon receiving messages from its neighbors v∈N(f), triggers callback function CallbackFacf. This, in turn, makes the publisher associated with f to publish (updated) messages on channels c(f→v) for all v∈N(f). And this continues and thus implementing message dynamics, such as those found in the Akka and Cilkplus platforms.

In some implementations, the CallbackFac and CallbackVar functions may be defined as follows:

```
procedure CALLBACKVAR_v(c(f → v), data)        procedure CALLBACKFAC_f(c(v → f), data)
    Update message state from f → v:              Update message state from v → f:
        m_{f→v} ← data                                m_{v→f} ← data
    for each f' ∈ N(v), update                    for each v' ∈ N(f), update
        m_{v→f'} ← UPDATEVAR_v(x_v; m_{g→v}, g ∈ N(v); f')    m_{f→v'} ← UPDATEFAC_f(y_f; m_{u→f}, u ∈ N(f); v')
    for each f' ∈ N(v)                            for each v' ∈ N(f)
        PUBLISH(v, c(v → f'), m_{v→f'})               PUBLISH(f, c(f → v'), m_{f→v'})
    return                                        return
``` where v is a variable, c(f→v) is a message received from f to v, f→v is, N(v) is neighbors of variable v that are factors, f' is any such neighbor of v, m_v→f is a message from variable v to factor f', x_v is information or input data associated with v, m_{g→v} is a message from factor g to variable v, and m_{v→f} is the message from variable v to factor f.

Heuristics for Scaling Implementation

According to aspects of the disclosure, implementations of graph-based programs that are executing on a messaging platform, such as the messaging platform 230 discussed above, may employ at least one of the following two heuristics:

Nodes as Channels.

For graphs that are dense, i.e. number of edges are much larger than number of nodes (|E|»|V|+|F|), it may make sense to made each node (in V∪F) as a channel and each message update mv→f,mf→v is published to the channel corresponding to the originating node rather than the corresponding edge. In some implementations, this can help scale PubSub infrastructure better with respect to the number of channels. (Eg., see also FIG. 4C).

Partitioning. In some implementations, when a graph-based program, such as the graph-based program 110, is executed on a computing system, the computational load associated with each node in a graph (e.g., a factor graph) that is part of the based program can be very light. In such instances, it makes sense to "group" a collection of nodes (e.g., variable nodes and graph nodes) as "meta nodes" in the graph compute so that the resulting "meta factor graph" is smaller while keeping the size of each group manageable. The partitioning can be simply done in a greedy manner or can be done by utilizing graph partitioning methods that minimize the number of edges crossing or minimize the weighted cut size between partitions.

Proof that the Graph-Based Language is Turing Complete

According to aspects of the disclosure, it will be understood that synchronous-mode implementations of the graph-based language, which rely on a factor graph, are Turing complete.

To establish the expressibility of the graph-based language, it can be argued that a recursive neural network architecture can be simulated within the framework of the graph-based language. More particularly, it has been previously established that a recursive neural network is Turing complete, which in turn leads to the conclusion that at least some implementations of the graph-based language discussed throughout the disclosure are also Turing-complete. (See Siegelmann, H. T., and Sontag, E. D. On the computational power of neural nets. *Journal of computer and system sciences* 50, 1 (1995), 132-150.) For instance, let the proof start by defining a recursive neural network considered by Sieglman. In Siegalman, the authors defined processor net as a non-linear dynamical system with external input. Specifically, let t≥1 denote discrete time. Let x(t)∈Qd denote the finite-dimensional state of the dynamical system at time t with rational values. Let u(t)∈{0, 1}p denote p-dimensional external binary input at each t. The state is updated as $$x(t+1)=\sigma(Ax(t)+bu(t)+c),$$

where A∈Qd×d,b∈Qd×p and c∈Qd are system parameters; with notation σ(q1, . . . , qd)=(σ(q1), . . . , σ(qd)) for q1, . . . , qd∈Q; and the sigmoid function σ:R→[0, 1] is defined as $$\sigma(q) = \begin{cases} 0 & \text{if } q < 0 \\ q & \text{if } q \in [0, 1] \\ 1 & \text{if } q > 1. \end{cases}$$

Using the above setup, a theorem can be established which provides that "any processor net can be simulated using factor graph computing synchronous mode."

Figure 14:
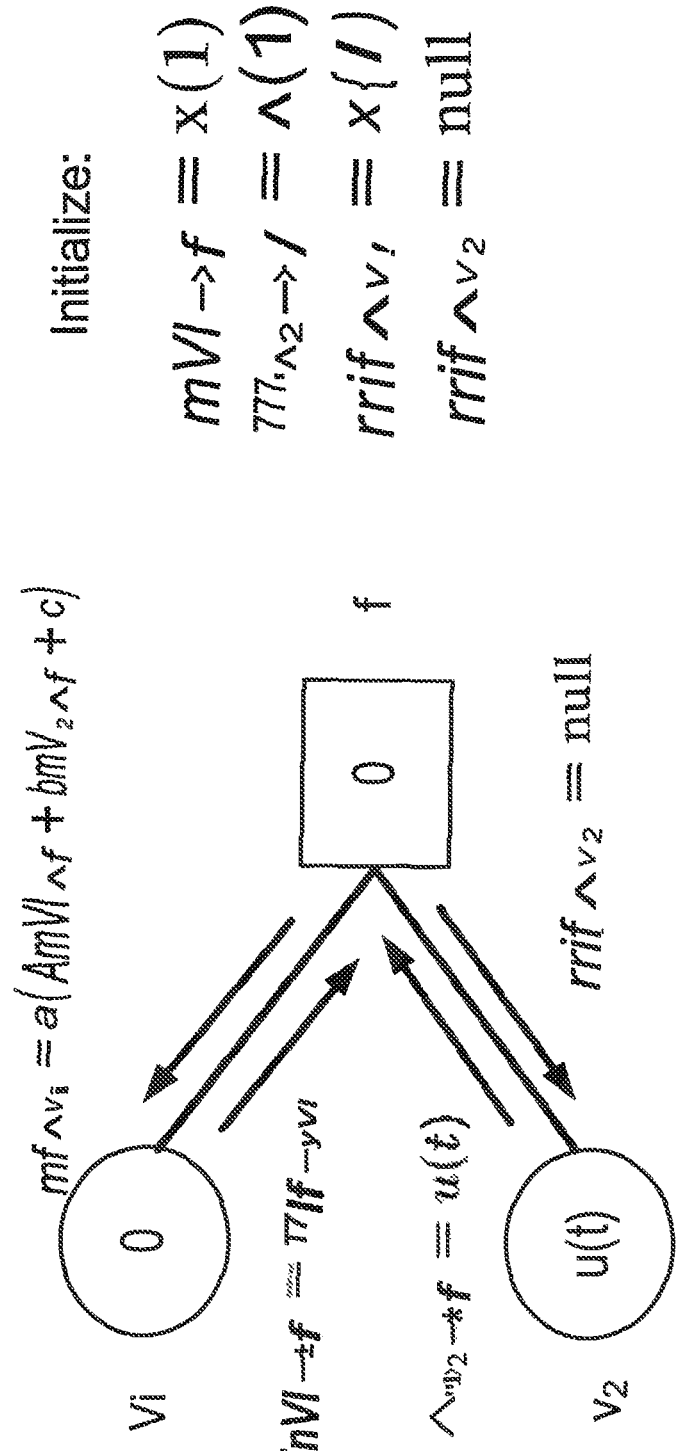
FIG. 14 is a diagram of an example of a factor graph, according to aspects of the disclosure.

To establish this theorem, it can be shown that a factor graph representation can be established for any processor net. Such a factor graph is shown in FIG. 14. Specifically, a processor net can be simulated using a factor graph that has two variable nodes V=(v1,v2) and a factor node F={f}. The state associated with node v1 is xv1=0, while the state associated with v2 is the external input of the processor net, x_v2=u(t). The state associated with factor node f, yf=0 as well. The message update function associated with factor node f is given as:

$$UPDATEFAC_f(y_f; m_{v_1 \to f}, m_{v_2 \to f}; v) =$$
$$\begin{cases} \sigma(Am_{v_1 \to f} + bm_{v_2 \to f} + c) & \text{if } v = v_1, \\ \text{null} & \text{if } v = v_2. \end{cases}$$

The message update function associated with variable nodes v1 and v2 are given as:

$$UPDATEVAR_{v_1}(x_{v_1}; m_{f \to v_1}; f) = m_{f \to v_1},$$

$$UPDATEVAR_{v_2}(x_{v_2}; m_{f \to v_2}; f) = m_{f \to v_2},$$

As shown in FIG. 14, messages can be initialized as:

$$m_{v_1 \to f} = x(1)$$

$$m_{v_2 \to f} = u(1)$$

$$m_{f \to 1} = x(1)$$

$$m_{f \to 2} = \text{null}.$$

Here x(1),u(1) are initial state of the processor net and external input, respectively. Let the factor graph computation be done in synchronous mode with the state of v2 being updated in time t to be the external input u(t). Then it can be easily checked that the mf→v1 at the end of time instance t is precisely x(t+1) of the processor net. That is, the processor net has been successfully simulated. This completes the proof.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms, do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

We claim:

1. A method for use in a system comprising a messaging platform and a plurality of computing units, the method comprising:
   receiving a graph-based program that identifies a bipartite graph and one or more update function sets, the bipartite graph including a plurality of graph nodes and a plurality of edges, such that each graph node corresponds to one of the update function sets;
   associating each of the computing units with a different respective one of the graph nodes, the associating including providing the computing unit with the respective graph node's corresponding update function set;
   instantiating, by the messaging platform, a plurality of channels, the plurality of channels defining a topology that matches a topology of the bipartite graph, each of the plurality of channels being associated with at least a pair of the computing units, the computing units in the pair being associated with respective graph nodes in the bipartite graph that are connected by one of the plurality of edges, such that one of the computing units in the pair is registered on the channel as a publisher, and the other one of the computing units in the pair is registered on the channel as a subscriber; and
   executing, by the messaging platform, the graph-based program to produce a result;
   wherein each of the computing units is configured to execute a respective callback function, which, when invoked, causes the computing unit to execute the update function set that is provided to the computing unit, and
   wherein executing the graph-based program includes providing a respective initial message to each of the computing units and invoking each computing unit's respective callback function.

2. The method of claim 1, wherein the one or more update function sets at least in part define data processing operations that are to be performed by the computing units in an order that is specified by the topology of the bipartite graph.

3. The method of claim 1, wherein: (a) the bipartite graph is a factor graph, (b) the plurality of channels define a topology that is the same as the topology of the factor graph, and (c) each of the plurality of channels has only one subscriber that is registered on the channel, and (d) each of the plurality of channels has one or more publishers that are registered on the channel.

4. The method of claim 1, wherein at least two of the computing units are implemented using different physical computing devices, each physical computing device including a respective processing circuitry and a respective memory.

5. The method of claim 1, wherein at least two of the computing units are implemented as different processes that are executed on the same physical computing device.

6. The method of claim 1, wherein at least two of the computing units are implemented as different virtual machines that are executed on the same physical computing device.

7. The method of claim 1, wherein executing the graph-based program includes receiving, by the messaging platform, a plurality of messages, and distributing, by the messaging platform, the plurality of messages to one or more of the computing units, wherein each of the plurality of messages is: (a) generated by one of the computing units, (b) received on one of the plurality of channels on which the computing unit is registered as a publisher, and (c) transmitted to another one of the computing units that is registered as a subscriber on the channel.

8. The method of claim 7, wherein the plurality of messages are distributed in a synchronous manner, such that all messages that are received during any of a plurality of consecutive time periods are transmitted substantially concurrently from the messaging platform to one or more of the computing units.

9. The method of claim 1, wherein:
   each of the computing units is registered as a publisher on at least one of the plurality of channels, and
   the update function set that is provided to any of the computing units is configured to, when executed by the computing unit, cause the computing unit to generate a plurality of messages and transmit the plurality of messages over channels on which the computing unit is registered as a publisher, such as each of the plurality of messages is generated by a different one of the update functions in the set of update functions, and each of the plurality of messages is transmitted over a different channel.

10. A system comprising:
    a memory; and
    a processing circuitry operatively coupled to the memory, the processing circuitry being configured to:
    receive a graph-based program that identifies a bipartite graph and one or more update function sets, the bipartite graph including a plurality of graph nodes and a plurality of edges, such that each graph node corresponds to one of the update function sets;
    associate each of a plurality of computing units with a different respective one of the graph nodes, the associating including providing the computing unit with the respective graph node's corresponding update function set;
    instantiate a plurality of channels, the plurality of channels defining a topology that matches a topology of the bipartite graph, each of the plurality of channels being associated with at least a pair of the computing units, the computing units in the pair being associated with respective graph nodes in the bipartite graph that are connected by one of the plurality of edges, such that one of the computing units in the pair is registered on the channel as a publisher, and the other one of the computing units in the pair is registered on the channel as a subscriber; and execute the graph-based program to produce a result, wherein each of the computing units is configured to execute a respective callback function, which, when invoked, causes the computing unit to execute the update function set that is provided to the computing unit, and wherein executing the graph-based program includes providing a respective initial message to each of the computing units and invoking each computing unit's respective callback function.

11. The system of claim 10, wherein the one or more update function sets at least in part define data processing operations that are to be performed by the computing units in an order that is specified by the topology of the bipartite graph.

12. The system of claim 10, wherein: (a) the bipartite graph is a factor graph, (b) the plurality of channels define a topology that is the same as the topology of the factor graph, and (c) each of the plurality of channels has only one subscriber that is registered on the channel, and (d) each of the plurality of channels has one or more publishers that are registered on the channel.

13. The system of claim 10, wherein at least two of the computing units are implemented using different physical computing devices, each physical computing device including a respective processing circuitry and a respective memory.

14. The system of claim 10, wherein at least two of the computing units are implemented as different processes that are executed by the processing circuitry.

15. The system of claim 10, wherein at least two of the computing units are implemented as different virtual machines that are executed by the processing circuitry.

16. The system of claim 10, wherein executing the graph-based program includes receiving a plurality of messages, and distributing the plurality of messages to one or more of the computing units, wherein each of the plurality of messages is: (a) generated by one of the computing units, (b) received on one of the plurality of channels on which the computing unit is registered as a publisher, and (c) transmitted to another one of the computing units that is registered as a subscriber on the channel.

17. The system of claim 10, wherein the plurality of messages are distributed in a synchronous manner, such that all messages that are received during any of a plurality of consecutive time periods are transmitted substantially concurrently to one or more of the computing units.

18. The system of claim 10, wherein:

each of the computing units is registered as a publisher on at least one of the plurality of channels, and the update function set that is provided to any of the computing units is configured to, when executed by the computing unit, cause the computing unit to generate a plurality of messages and transmit the plurality of messages over channels on which the computing unit is registered as a publisher, such as each of the plurality of messages is generated by a different one of the update functions in the set of update functions, and each of the plurality of messages is transmitted over a different channel, receiving a graph-based program that identifies a bipartite graph and one or more update function sets, the bipartite graph including a plurality of graph nodes and a plurality of edges, such that each graph node corresponds to one of the update function sets;

associating each of the computing units with a different respective one of the graph nodes, the associating including providing the computing unit with the respective graph node's corresponding update function set;

instantiating a plurality of channels, the plurality of channels defining a topology that matches a topology of the bipartite graph, each of the plurality of channels being associated with at least a pair of the computing units, the computing units in the pair being associated with respective graph nodes in the bipartite graph that are connected by one of the plurality of edges, such that one of the computing units in the pair is registered on the channel as a publisher, and the other one of the computing units in the pair is registered on the channel as a subscriber; and executing the graph-based program to produce a result, wherein each of the computing units is configured to execute a respective callback function, which, when invoked, causes the computing unit to execute the update function set that is provided to the computing unit, and wherein executing the graph-based program includes providing a respective initial message to each of the computing units and invoking each computing unit's respective callback function.

* * * * *